United States Patent
Barker et al.

(10) Patent No.: US 8,269,668 B2
(45) Date of Patent: Sep. 18, 2012

(54) DIVERSITY ANTENNA SYSTEM WITH ELECTRICAL TILT

(75) Inventors: David Edwin Barker, Worcestershire (GB); Louis David Thomas, Worcestershire (GB); Stephen Thomas Newbold, Worcestershire (GB); Philip Edward Haskell, Hampshire (GB)

(73) Assignee: Quintel Technology Limited, Bristol (GB)

( * ) Notice: Subject to any disclaimer, the term of this patent is extended or adjusted under 35 U.S.C. 154(b) by 749 days.

(21) Appl. No.: 12/280,813

(22) PCT Filed: Aug. 10, 2007

(86) PCT No.: PCT/GB2007/003047
§ 371 (c)(1),
(2), (4) Date: Aug. 27, 2008

(87) PCT Pub. No.: WO2008/020178
PCT Pub. Date: Feb. 21, 2008

(65) Prior Publication Data
US 2009/0066595 A1 Mar. 12, 2009

(30) Foreign Application Priority Data
Aug. 18, 2006 (GB) .................................. 0616449.5

(51) Int. Cl.
*H01Q 3/00* (2006.01)
*H01Q 21/06* (2006.01)
*H01Q 21/24* (2006.01)
*H04B 7/10* (2006.01)
(52) U.S. Cl. ........................................ 342/372; 342/361
(58) Field of Classification Search .................. 342/372, 342/361
See application file for complete search history.

(56) References Cited

U.S. PATENT DOCUMENTS

| 5,229,729 A | | 7/1993 | Nishikawa et al. | |
| 5,584,058 A | | 12/1996 | Arnold | |
| 6,046,700 A | * | 4/2000 | Kitchener et al. | 343/725 |
| 6,094,165 A | * | 7/2000 | Smith | 342/373 |
| 6,094,166 A | * | 7/2000 | Martek et al. | 342/374 |

(Continued)

FOREIGN PATENT DOCUMENTS

EP 1 156 549 11/2001

(Continued)

OTHER PUBLICATIONS

PCT International Preliminary Report on Patentability for PCT/GB2007/003047, Mar. 5, 2009, copy consists of 8 pages.

(Continued)

*Primary Examiner* — Jack W Keith
*Assistant Examiner* — Frank McGue

(57) ABSTRACT

A diversity antenna system with electrical tilt has two dual polarized, tilt adjustable antenna stacks (44A) and (44B) with physical separation providing space diversity. Each antenna stack (44A) or (44B) has two polarizations associated with independently adjustable electrical tilt angles. The electrical tilt angles of each antenna stack (44A) or (44B) are controlled to be equal to those of the other antenna stack to provide co-polarization or anti-polarization tilt coupling. The antenna system (40) may operate with multiple carrier frequencies each associated with a respective pair of polarizations of different antenna stacks (44A) and (44B) with co-polarization or anti-polarization tilt coupling. Antenna tilt angles are controllable so that different carrier frequencies are associated with independently adjustable angles of electrical tilt. The system may be used with groups of both contiguous and non-contiguous carrier frequencies.

28 Claims, 14 Drawing Sheets

U.S. PATENT DOCUMENTS

| | | | |
|---|---|---|---|
| 6,201,801 B1* | 3/2001 | Dent | 370/342 |
| 6,522,307 B2 | 2/2003 | Kim | |
| 7,069,052 B2* | 6/2006 | Ylitalo | 455/562.1 |
| 2005/0085267 A1* | 4/2005 | Lemson et al. | 455/562.1 |
| 2008/0107196 A1* | 5/2008 | Won | 375/260 |
| 2008/0198082 A1* | 8/2008 | Soler Castany et al. | 343/770 |
| 2008/0287163 A1* | 11/2008 | Skarby et al. | 455/562.1 |
| 2010/0060522 A1* | 3/2010 | Backlund et al. | 342/372 |

FOREIGN PATENT DOCUMENTS

| | | |
|---|---|---|
| JP | 2003-244046 | 8/2003 |
| JP | 2004-147154 | 5/2004 |
| WO | WO 98/43315 | 10/1998 |
| WO | WO 01/31807 | 5/2001 |
| WO | WO 01/59876 | 8/2001 |
| WO | WO 02/082581 | 10/2002 |
| WO | WO 03/034547 | 4/2003 |
| WO | WO 03/043127 | 5/2003 |
| WO | WO 03/058848 | 7/2003 |
| WO | WO 03/083992 | 10/2003 |
| WO | WO 03/107540 | 12/2003 |
| WO | WO 2004/036785 | 4/2004 |
| WO | WO 2004/051796 A1 | 6/2004 |
| WO | WO 2006/008452 | 1/2006 |

OTHER PUBLICATIONS

Examination Report for EP 07 789 176.0, Apr. 29, 2011, copy consists of 9 pages.

Translation of Office Action for Japanese Patent Application No. 2009-524223, Oct. 4, 2011, copy consists of 4 unnumbered pages.

Japanese Patent Application No. JP 2005-522062A, cited in Office Action for Japanese Application No. 2009-524223, dated Oct. 4, 2011.

* cited by examiner

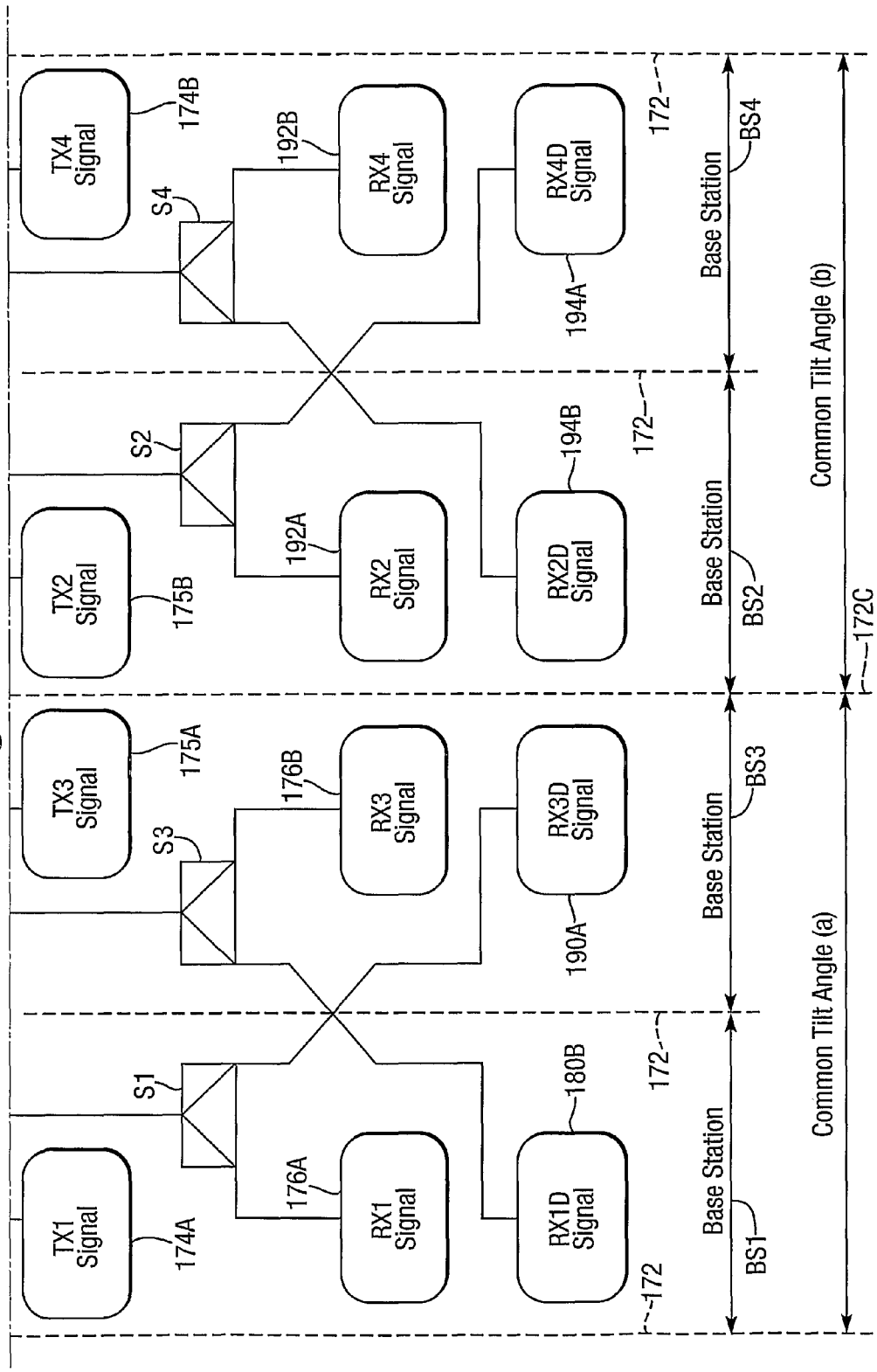

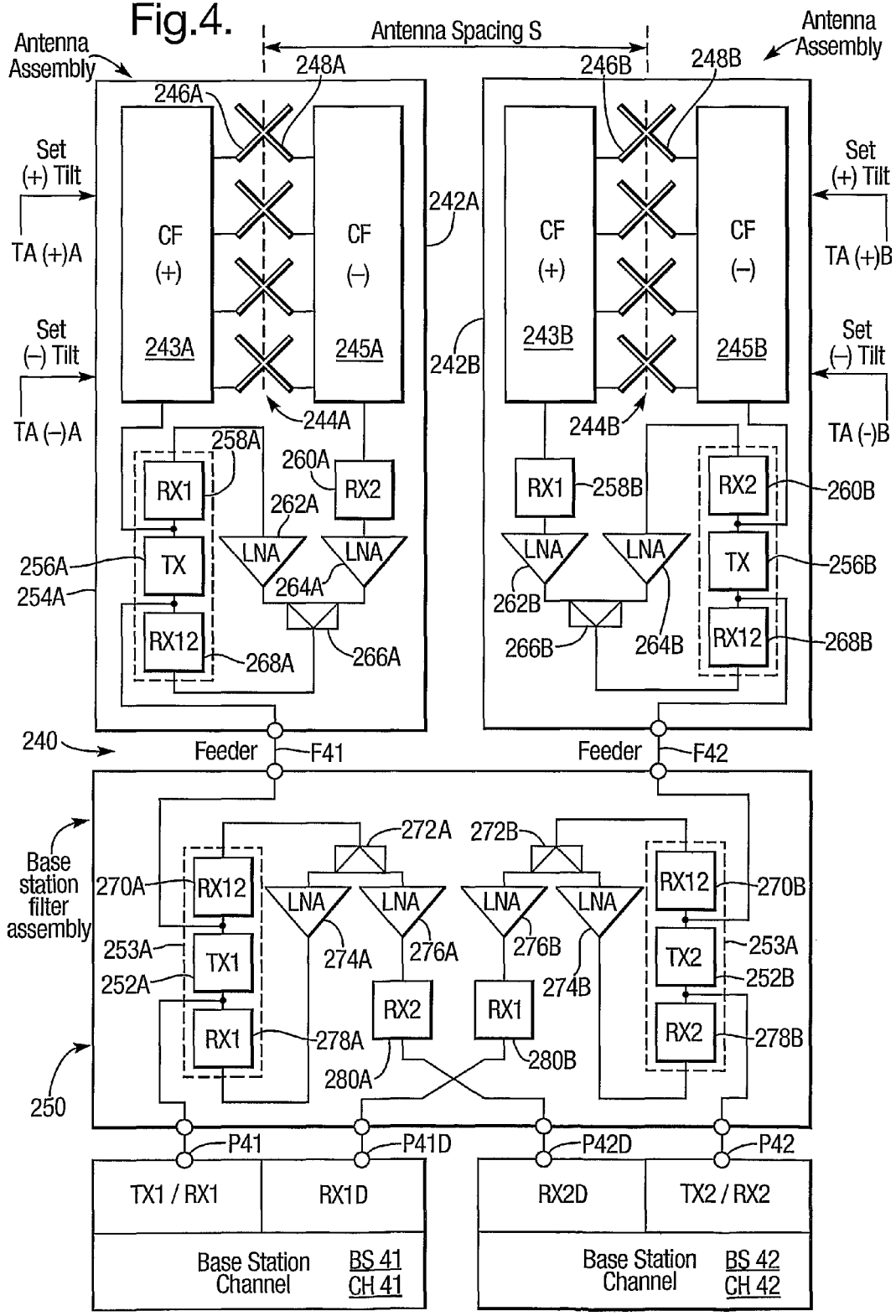

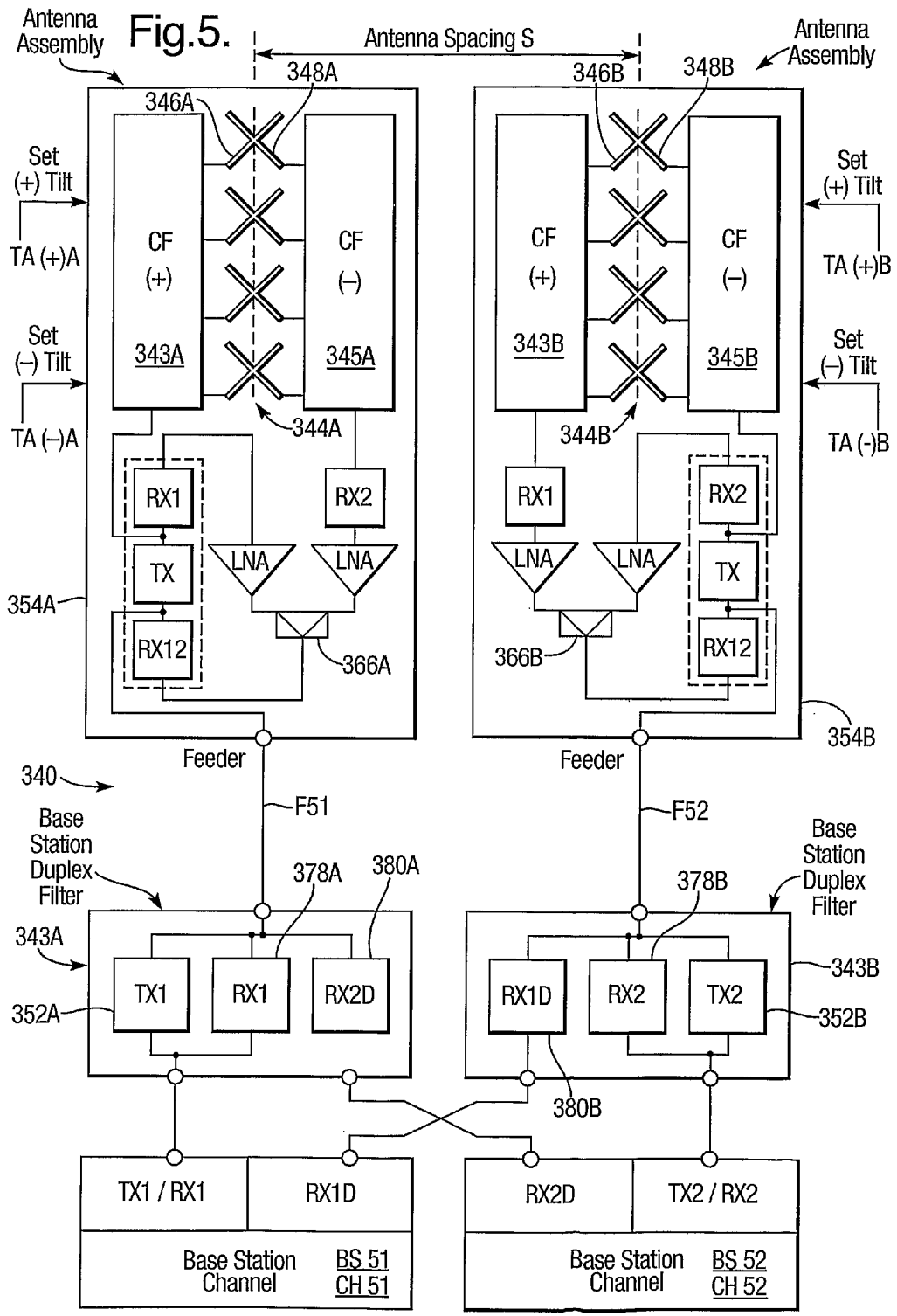

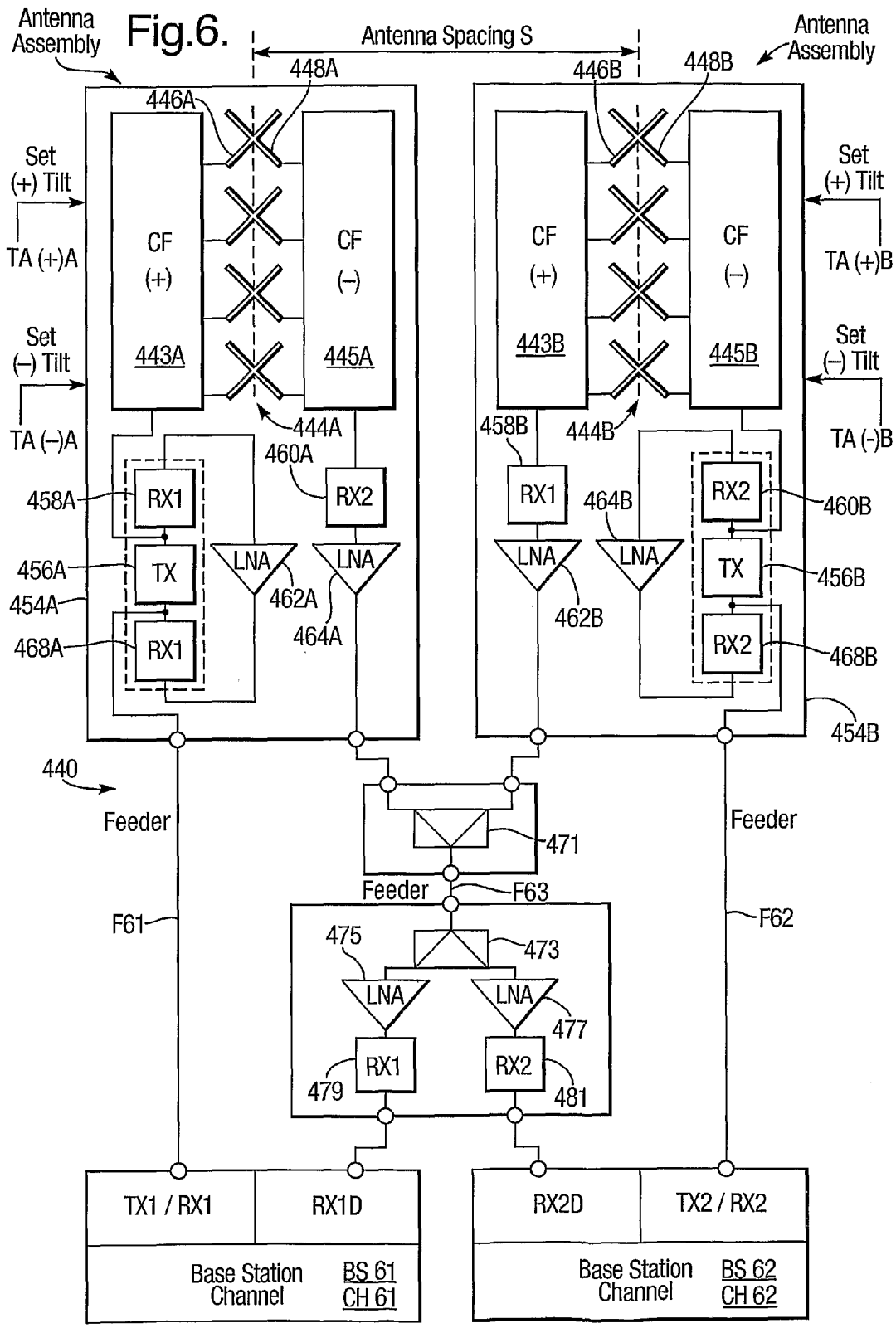

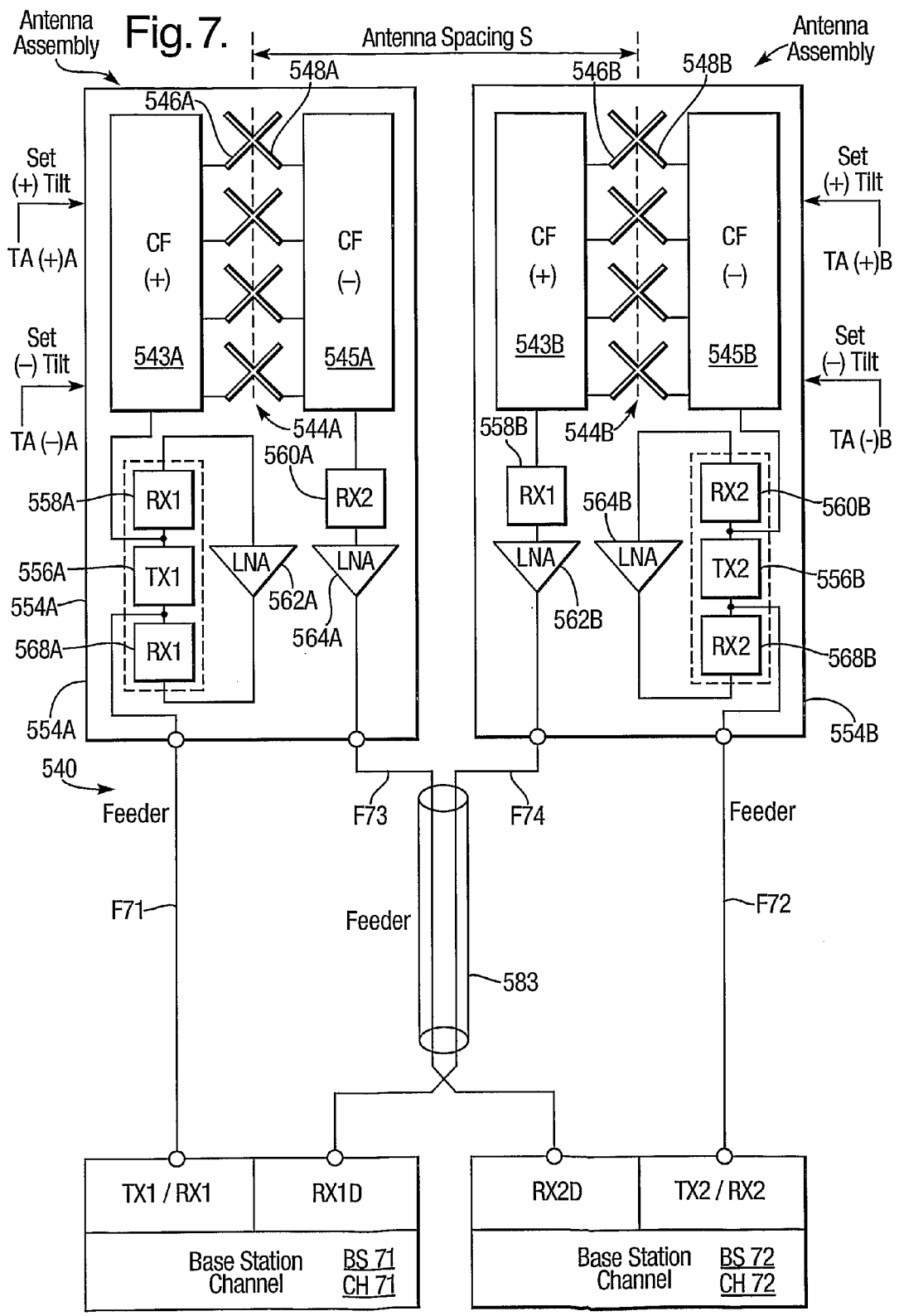

Fig.8.

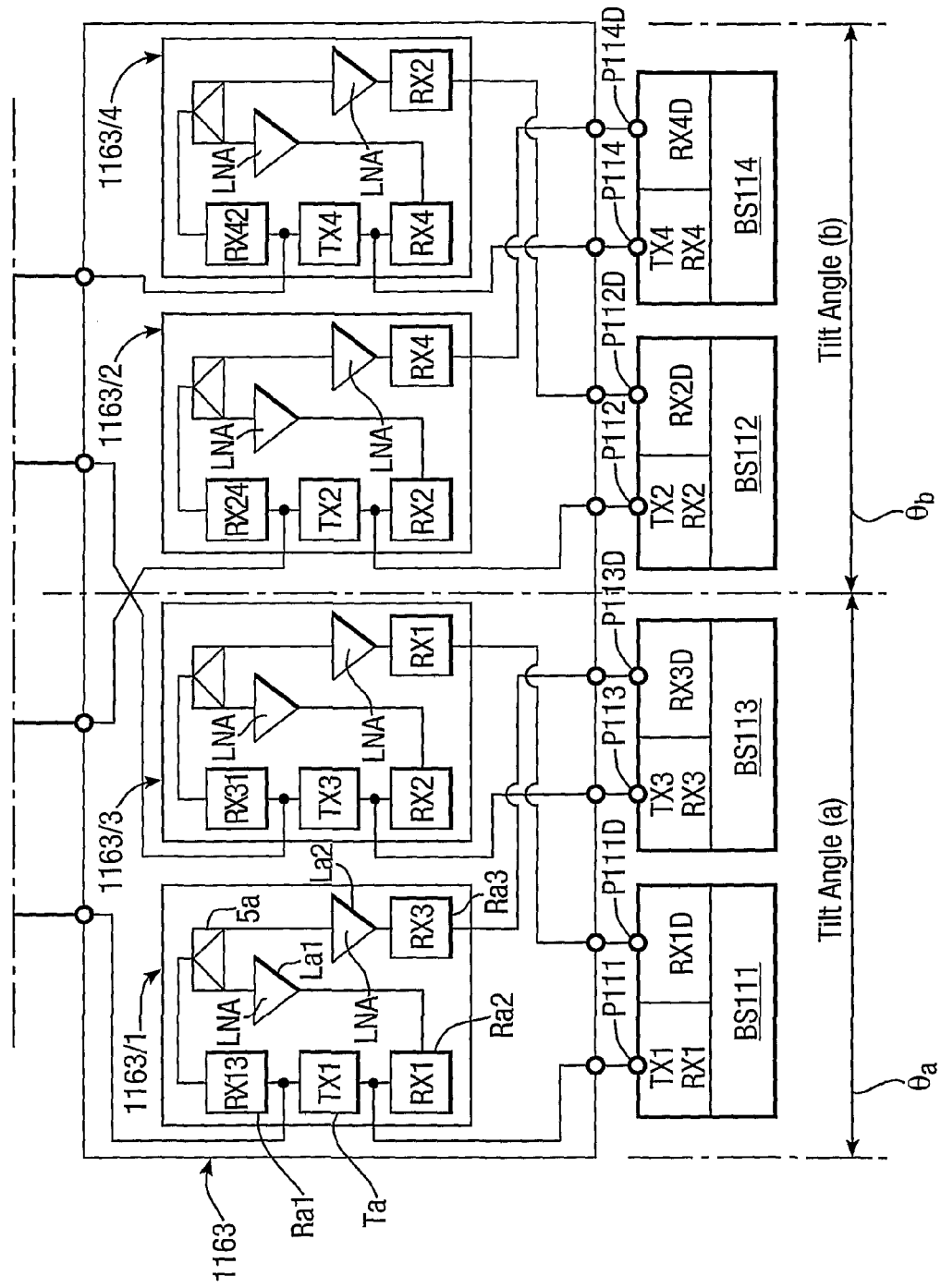

DIVERSITY ANTENNA SYSTEM WITH ELECTRICAL TILT

BACKGROUND OF THE INVENTION (1) Field of the Invention

This invention relates to a diversity antenna system with electrical tilt, i.e. a phased array antenna system with space diversity and electrical tilt capability. It is relevant to many antenna systems such as those used for telecommunications, for example cellular mobile radio networks commonly referred to as mobile telephone networks. Such networks include second generation (2G) mobile telephone networks implemented by a cellular radio standard such as GSM and third generation (3G) mobile telephone networks implemented by a cellular standard such as the Universal Mobile Telephone System (UMTS). Other cellular radio standards include IS95 and WCMA2000.

(2) Description of the Art

Operators of conventional cellular radio networks generally employ their own base stations each of which is connected to one or more antennas. In such a network, the antennas are a primary factor in defining the desired coverage area which is generally divided into a number of overlapping cells, each associated with a respective antenna and base station. Each cell contains a fixed-location base station which maintains radio communication with mobile radios in that cell. Base stations are interconnected with one another for communication purposes, e.g. by fixed land lines arranged in a grid or meshed structure, allowing mobile radios throughout the cell coverage area to communicate with each other as well as with the public telephone network outside the cellular mobile radio network.

To improve and optimise communications performance in antenna systems used in cellular radio networks, it is known to use three techniques, space diversity, polarisation diversity and variable electrical tilt. The first such technique, i.e. space diversity, involves using two spaced apart antennas each giving rise to a respective received signal from a remote subscriber using a mobile telephone handset: this makes two received signals available from a single handset thereby providing a communications advantage.

Signals received by a base station undergo rapid fluctuations in power because they have traversed multipath environments: i.e. replicas of a signal transmitted from a mobile telephone handset pass via multiple paths or routes to a receiving base station, and the handset itself is in motion during transmission. Moreover, such replicas become decorrelated with one another. Signals received by a base station may be combined using, for example, Maximal Ratio Combining (MRC), which provides significant performance gains for an up-link channel from a mobile handset to a base station.

The second technique for improving communications performance, i.e. polarisation diversity, may be obtained by means of an antenna having two sets of antenna elements, each set providing an angle of maximum signal transmission or reception sensitivity which is orthogonal to that of the other set. Two signals received by such an antenna from a single mobile handset via different multipath routes are at least partly uncorrelated relative to one another, and consequently they may be combined to improve received signal quality.

The third technique for improving communications performance, i.e. variable electrical tilt, arises from the properties of a phased array of antenna elements. Such an antenna forms a main beam in response to in phase excitation of its antenna elements or excitation which varies across the array as a linear function of element position in the array. Changing the gradient of this function changes the inclination or angle of the main beam to the main beam direction which corresponds to in phase excitation. This allows an operator of a cellular mobile radio network to alter the angle of the main beam to the vertical, which in turn adjusts the ground coverage area served by the antenna and enables interference to be reduced between messages associated with different cells: here a cell is a region with which an antenna communicates, and there may be more than one cell per antenna.

Operators of cellular radio network face increasing demand for traffic capacity, but are subject to planning or zoning restrictions which limit deployment of new sites or addition of antennas to existing sites. Consequently it is desirable to increase antenna traffic capacity without adding antennas, e.g. by operators sharing an antenna, while retaining capability for space diversity and adjustment of respective angles of electrical tilt by individual users (operators (Europe), or carriers (USA)) independently of one another.

SUMMARY OF THE INVENTION

It is an object of the invention to provide for space diversity at an antenna site with independent angles of electrical tilt for two operators.

The present invention provides an antenna system having two dual polarised, tilt adjustable antennas with physical separation providing space diversity, and wherein:
a) each antenna has polarisations associated with respective independently adjustable electrical tilt angles; and
b) each antenna has electrical tilt angles which are controllable to be equal to those of the other antenna and to provide one of co-polarisation tilt coupling and anti-polarisation tilt coupling.

The invention provides the advantage that it is useable with different carrier frequencies and different independently adjustable angles of electrical tilt: this provides capability for e.g. implementing a different cellular radio standard and/or adding a different operator without the need to provide additional antenna assemblies which would increase visual impact on the environment.

The antenna system may be for operation with at least one first carrier frequency associated with one pair of antenna polarisations having one of co-polarisation tilt coupling and anti-polarisation tilt coupling and at least one second carrier frequency associated with another pair of antenna polarisations having one of anti-polarisation tilt coupling and co-polarisation tilt coupling respectively, the antenna tilt angles being controllable to provide for the at least one first carrier frequency and the at least one second carrier frequency to be associated with different angles of electrical tilt. The at least one first carrier frequency and the at least one second carrier frequency may be first and second groups of carrier frequencies respectively.

The at least one first carrier frequency and the at least one second carrier frequency may be associated with one of multiple operators, multiple base stations and multiple cellular standards.

The antenna system may include two feeders to convey signals between base station equipment and antennas. It may include three such feeders, one of the feeders being for receive signals only, the receive signals being associated both with different antennas and with different antenna polarisations. It may include an additional (fourth) feeder for receive signals only.

Broad band filtering means may be co-located with the antenna system's antennas in antenna assemblies and narrow band filtering means may be co-located with base station equipment. Narrow band filtering means may also or alternatively be co-located with antennas.

The antenna system may include four feeders for conveying transmit and receive signals between base station equipment and antennas: two of the feeders may be associated with different polarisations of one of the antennas, and another two of the feeders being associated with different polarisations of the other of the antennas. Alternatively, the antennas may designated as first and second antennas, two of the feeders being for first and second transmit signals associated respectively with a first polarisation of the first antenna and a second polarisation of the second antenna, another of the feeders being for receive signals also associated respectively with the first polarisation of the first antenna and the second polarisation of the second antenna, and a fourth one of the feeders being for receive signals associated respectively with the second polarisation of the first antenna and the second polarisation of the first antenna.

Each polarisation of each antenna may be associated with a respective broad band filtering means, a respective feeder and a respective narrow band filtering means. Each broad band filtering means may be located in an antenna assembly and be connected by the respective feeder to the respective narrow band filtering means co-located with base station equipment. The narrow band filtering means may be arranged to divide signals with contiguous frequencies into groups of signals with non-contiguous frequencies.

The antenna system may include filtering means for defining signals of like frequency associated with different antennas and providing space diversity in at least one of transmit and receive modes of operation.

One antenna may have antenna elements arranged for transmission of a first frequency transmit signal and the other antenna may have antenna elements arranged for transmission of a first frequency space diversity transmit signal. One receive signal may be associated with multiple receive diversity signals.

In another aspect, the present invention provides a method of operating an antenna system having two dual polarised, tilt adjustable antennas with physical separation providing space diversity, the method including:
a) adjusting electrical tilt angles of each antenna's polarisations independently; and
b) controlling each antenna's electrical tilt angles to be equal to those of the other antenna to provide one of co-polarisation tilt coupling and anti-polarisation tilt coupling.

The method of the invention provides the advantage that it can implement different carrier frequencies and different independently adjustable angles of electrical tilt: this provides capability for e.g. implementing a different cellular radio standard and/or adding a different operator without the need to provide additional antenna assemblies which would increase visual impact on the environment.

The method may be implemented with at least one first carrier frequency associated with one pair of antenna polarisations having one of co-polarisation tilt coupling and anti-polarisation tilt coupling and at least one second carrier frequency associated with another pair of antenna polarisations having one of anti-polarisation tilt coupling and co-polarisation tilt coupling respectively, the antenna tilt angles being controllable to provide for the at least one first carrier frequency and the at least one second carrier frequency to be associated with different angles of electrical tilt. The at least one first carrier frequency and the at least one second carrier frequency may be first and second groups of carrier frequencies respectively.

The at least one first carrier frequency and the at least one second carrier frequency may be associated with one of multiple operators, multiple base stations and multiple cellular standards.

The method may be implemented with two feeders conveying signals between base station equipment and antennas. It may be implemented with three such feeders, one of the feeders being for receive signals only, the receive signals being associated both with different antennas and with different antenna polarisations. It may be implemented with an additional (fourth) feeder for receive signals only.

Broad band filtering may be implemented with filtering means co-located with the antenna system's antennas in antenna assemblies and narrow band filtering means may be co-located with base station equipment. Narrow band filtering may also or alternatively be implemented with means co-located with antennas.

The method may be implemented with four feeders conveying transmit and receive signals between base station equipment and antennas: two of the feeders may be associated with different polarisations of one of the antennas, and another two of the feeders being associated with different polarisations of the other of the antennas. Alternatively, the antennas may designated as first and second antennas, two of the feeders conveying first and second transmit signals associated respectively with a first polarisation of the first antenna and a second polarisation of the second antenna, another of the feeders conveying receive signals also associated respectively with the first polarisation of the first antenna and the second polarisation of the second antenna, and a fourth one of the feeders conveying receive signals associated respectively with the second polarisation of the first antenna and the second polarisation of the first antenna.

Each polarisation of each antenna may be associated with broad band filtering, a respective feeder and narrow band filtering. The broad band filtering may be implemented in an antenna assembly and the narrow band filtering may be implemented by means co-located with base station equipment. The narrow band filtering means may be arranged to divide signals with contiguous frequencies into groups of signals with non-contiguous frequencies.

Filtering means may be used to define signals of like frequency associated with different antennas and providing space diversity in at least one of transmit and receive modes of operation.

One antenna may have antenna elements arranged for transmission of a first frequency transmit signal and the other antenna may have antenna elements arranged for transmission of a first frequency space diversity transmit signal. One receive signal may be associated with multiple receive diversity signals.

DESCRIPTION OF THE FIGURES

In order that the invention might be more fully understood, embodiments thereof will now be described, by way of example only, with reference to the accompanying drawings, in which:—

FIG. 4 shows an antenna system of the invention similar to FIG. 2 but shown in more detail, and providing capability for two base stations with independently adjustable tilt angle and suitability for contiguous frequencies (as defined later);

FIG. 5 is a simplified version of FIG. 4 suitable for use with non-contiguous frequencies;

FIG. 6 shows an antenna system of the invention in which two base stations have independently adjustable angles of tilt; three feeders are used to simplify base station equipment;

FIG. 7 is a modified version of FIG. 6 with an extra feeder to reduce base station processing;

FIG. 8 is a modified version of FIG. 6 with base station filters added and antenna assemblies having like broad band filters;

DESCRIPTION OF THE INVENTION

In this specification (unlike nomenclature in the USA), a "carrier" means a carrier frequency, i.e. a radio frequency signal to which modulation is applied for telecommunications purposes, and "channel" is synonymous with carrier. One or more carriers may be used either by a single operator, or two or more operators, an operator being a user of a base station providing a mobile telephone communications service. Multiple carriers are not necessarily allocated to the same cellular radio system. Paired transmit and receive signals are indicated by TX and RX respectively with like numerical suffix, e.g. TX1 and RX1, or TX2 and RX2. Here the numerical suffix 1 or 2 indicates a first or second transmit or receive carrier frequency, and association with a first or second operator or base station. Space diversity transmit and receive signals are indicated by a suffix D, e.g. in TXD, RXD, TX1D, RX1D etc., and multiple space diversity signals are indicated by numeral following the suffix D, e.g. TX1D1, RX1D1. Up-link means a signal passing from a mobile telephone handset to a base station, and down-link means a signal passing in the reverse direction.

Figure 1:
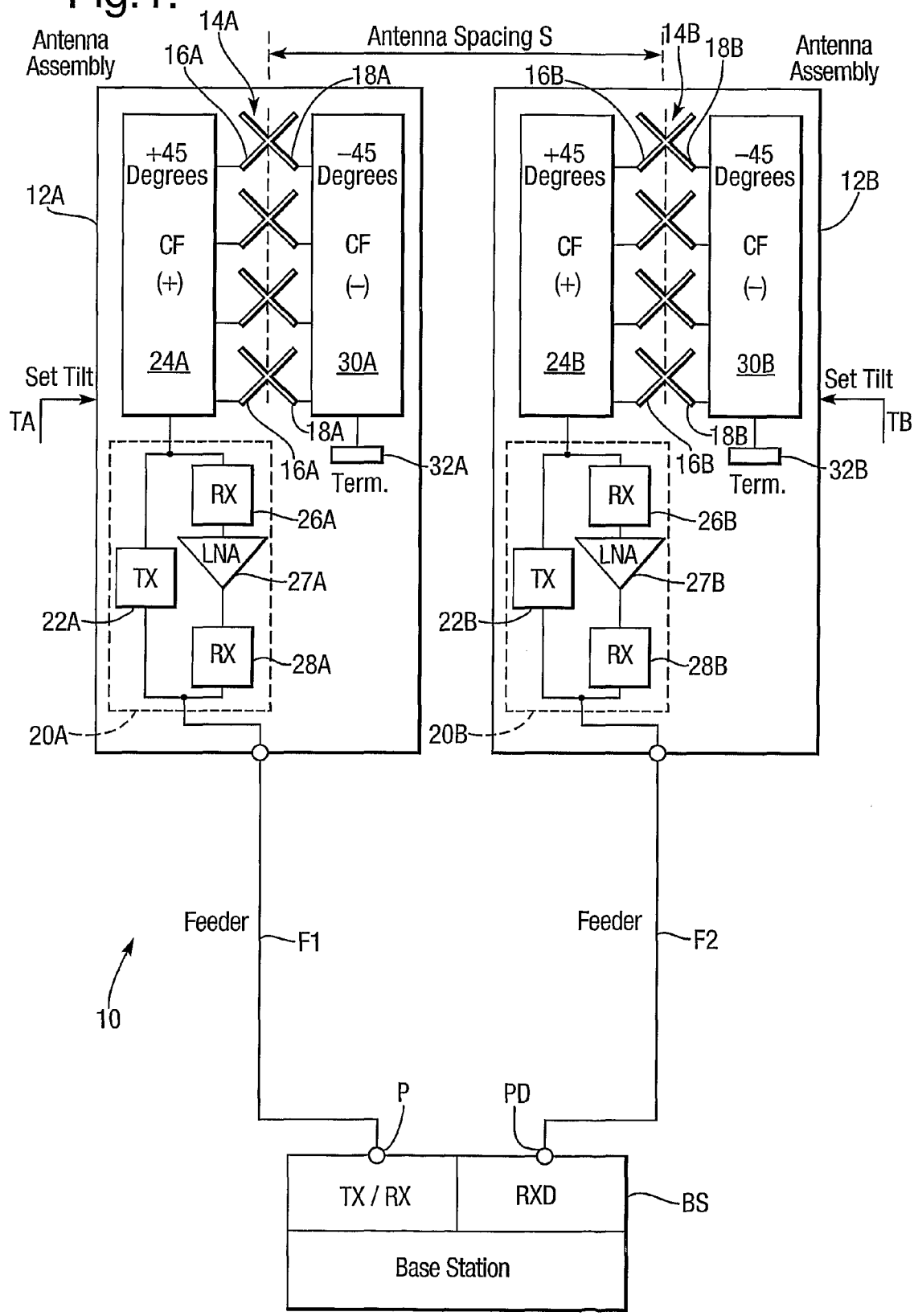
FIG. 1 shows a prior art antenna system in which a single base station has receive signals with space diversity.

Referring to FIG. 1, reference numeral 10 indicates generally a prior art antenna system with space diversity typical of that commonly in use. The system 10 has a base station BS with first and second ports P and PD: the first port P is for transmit and receive (TX/RX) signals, and the second port PD is for space diversity receive (RXD) signals only. The base station BS is arranged to transmit and receive (TX/RX) signals via a first antenna assembly 12A, and to receive via a second antenna assembly 12B a further signal (diversity receive signal RXD) providing space diversity by virtue of the spatial separation between these assemblies. The antenna assemblies 12A and 12B have first and second antenna stacks 14A and 14B respectively with a centre to centre spacing of S typically equal to ten to twenty wavelengths at the base station receive frequency. Each antenna stack 14A or 14B is a single antenna which comprises a vertical array of crossed dipoles such as 16A and 18A with mutually orthogonal polarisations: these polarisations are disposed respectively at +45 and −45 degrees to the vertical and slanting upwards to the right (herein positive (+) polarisation) and left (herein negative (−) polarisation) respectively.

The antenna assemblies 12A and 12B incorporate antenna tilt angle controls TA and TB, which provide control of the angles of the beams from the antenna stacks 14A and 14B respectively independently of one another. The antenna assemblies 12A and 12B necessarily have the same angle of electrical tilt in order to enable them to receive respective spatially diverse replicas of a single signal transmitted from an individual mobile telephone handset.

A TX signal for transmission from the first antenna stack 14A at +45 degrees polarisation is fed from the first base station port P to a first feeder F1: this feeder carries the TX signal up an antenna support mast (not shown) to the first antenna assembly 12A. Here the TX signal passes into a transmit/receive amplifier/filter unit 20A indicated within dotted lines: in the unit 20A it is filtered by a transmit band pass filter (TX) 22A, from which it is output to the first antenna stack 14A via a first corporate feed network 24A. The network 24A is of known kind: it is a cascaded array of signal splitters arranged to convert the TX signal into a set of antenna element signals each fed to a respective positive polarisation antenna dipole element such as 16A.

The first corporate feed network 22A also operates in reverse when receiving up-link signals from a mobile station. Up-link signals from the first corporate feed network 24A are connected to the unit 20A, which provides different signal paths for RX and TX signals: this unit amplifies RX signals to counteract signal degradation due to losses in the feeder F1.

Consequently, TX signals and RX signals for transmission from or received by positive polarisation antenna dipole elements such as 16A are separated into TX and RX paths via the TX filter 22A and the RX filter 26A respectively. The RX signal is amplified by a low noise amplifier (LNA) 27A and filtered by a second receive band pass filter (RX) 28A; it then joins the TX signal path between the band pass filter 22A and feeder F1. The TX filter 22A and the RX filter 28A present correct system impedance, typically 50 Ohms, within their respective pass bands to the feeder F1 to which they are connected. The RX signal is relayed along the first feeder F1 to the first base station port P.

The negative polarisation antenna dipole elements such as 18A of the antenna stack 14A have the capability of transmitting and receiving signals and are connected to a second corporate feed network 30A. However, this capability is not used, as indicated by the second corporate feed network 30A having a port terminated in a matched load 32A.

The second antenna assembly 12B is equipped and arranged similarly to the first: it is like-referenced with suffix B replacing suffix A, and will not be described in detail. It is used only in reception mode (TX filter 22B is therefore redundant). It is spatially displaced from the first antenna assembly 12A, and consequently reception mode operation provides a space diversity receive (RXD) signal via a second feeder F2 to the base station diversity port PD.

In practice, commercially available antenna assemblies such as 12A and 12B are supplied with two transmit/receive amplifier/filter units such as 20A, one for each corporate feed 24A/30A. This provides capability for transmission and reception on both antenna stack polarisations, albeit as shown in FIG. 1 this capability is not fully exploited.

The prior art space diversity antenna system 10 has a number of disadvantages:
1. if the system 10 is shared by multiple operators, the operators only have access to a single angle of electrical tilt;

2. if the system 10 is adapted for operation with multiple carrier frequencies (or radio frequency (RF) channels) by a single operator, the operator will not be able to optimise the system simultaneously for multiple technologies, e.g. two different cellular radio standards such as GSM and UMTS;

3. if multiple users share the antenna system, any operator's cell deployment will in general be different from that of another and consequently only one of the operators will be able to optimise cell coverage and minimise mutual interference between cells; and 4. the antenna system 10 is used inefficiently: i.e. both antenna stacks 14A and 14B have the capacity to transmit and receive on two mutually orthogonal polarisations, but only one polarisation is used in each case.

The present invention is intended to enable multiple carrier frequencies and/or operators to share a space diversity antenna installation so that:

1. independent angles of electrical tilt are available for multiple base stations;
2. polarisation diversity is available in addition to space diversity;
3. up-link gain to be increased by the use of two antennas implementing space diversity reception: this reduces the overall power consumption for a community of mobile telephone users; and
4. further operators may be added to an existing space diversity antenna system without increasing antenna numbers or visual impact on the environment.

Figure 2:
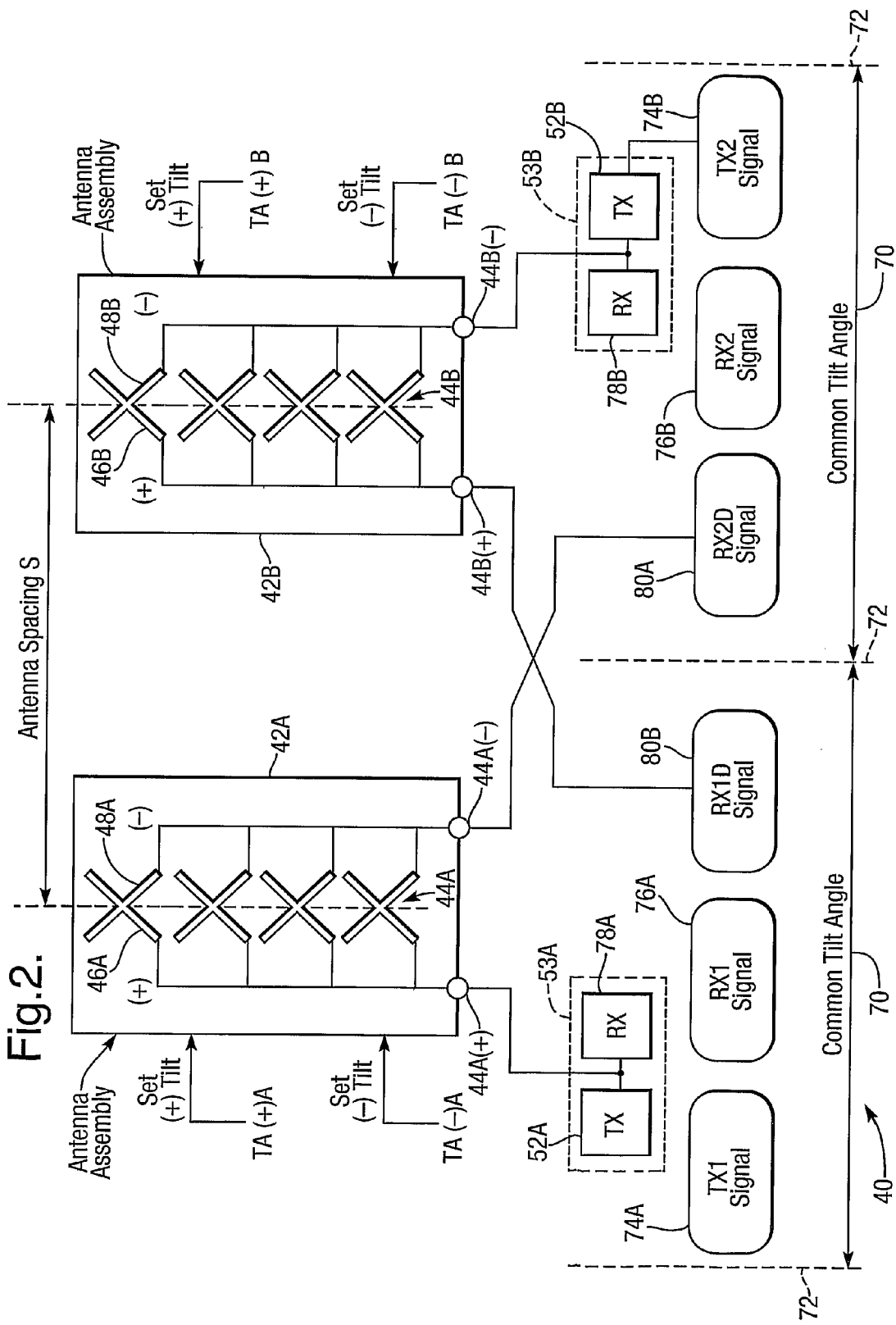
FIG. 2 shows an antenna system of the invention in which two base stations have receive signals with space diversity and use antenna assemblies with co-polarisation tilt coupling.

Referring now to FIG. 2, an antenna system 40 of the invention is shown in simplified form: to simplify the drawing conventional items (e.g. base stations, filters, corporate feeds and low noise amplifiers for receive signals) are omitted. The system 40 is suitable for use with two base stations sharing space diversity antenna equipment. It has first and second antenna assemblies 42A and 42B with first and second antenna stacks 44A and 44B respectively with a centre to centre spacing S in the range ten to twenty wavelengths at antenna system receive frequency. Each antenna stack 44A or 44B comprises a vertical array of pairs of crossed antenna dipoles such as 46A and 48A or 46B and 48B. The antenna stacks 44A and 44B are each dual polarised; i.e. each pair of dipoles such as 46A and 48A or 46B and 48B has mutually orthogonal geometrical inclinations relative to one another giving rise to positive (+) and negative (−) polarisations respectively at +45 degrees and −45 degrees to the vertical.

The first antenna stack 44A has two mutually orthogonal input/output ports 44A(+) and 44A(−) connected to positive polarisation dipoles such as 46A and negative polarisation dipoles such as 48A respectively: here two antenna stack ports are orthogonal to one another if a signal input to one of the ports does not give rise to a received signal of appreciable magnitude output from the other port. Similarly, the second antenna stack 44B has two mutually orthogonal input/output ports 44B(+) and 44B(−) connected to positive polarisation dipoles such as 46B and negative polarisation dipoles such as 48B respectively.

The first antenna assembly 42A has first and second tilt angle controls TA(+)A and TA(−)A for control of electrical tilt of positive and negative polarisation antenna beams respectively. First tilt angle control TA(+)A provides control of a tilt angle of an antenna beam from positive polarisation antenna dipoles such as 46A; similarly, second tilt angle control TA(−)A provides control of a tilt angle of an antenna beam from negative polarisation antenna dipoles such as 48A. Likewise, the second antenna assembly 42B has tilt angle controls TA(+)B and TA(−)B for electrical tilt angles from positively and negatively polarised antenna dipoles such as 46B and 48B respectively.

Each of the antenna assemblies 42A and 42B has independent adjustment of the angle of electrical tilt for each polarisation: this is not part of contemporary Variable Electrical Tilt (VET) antenna designs; such designs incorporate adjustment of each polarisation but they couple adjustment mechanisms together such that both polarisations are tilted together in unison from a single control input. In the example of the invention described with reference to FIG. 2, individual adjustment of tilt for each polarisation of each antenna assembly 42A or 42B may be implemented by providing separate control access to the adjustment mechanism for each polarisation: such control access may for example be implemented locally via a screw adjustment, or remotely from the antenna assembly 42A or 42B using a servo mechanism.

The positive polarisation antenna beam tilt angle controls TA(+)A and TA(+)B for the first and second antenna assemblies 42A and 42B are adjusted in this embodiment so that the same common tilt angle is applied to both of the positive polarisation antenna beams from the first and second antenna stacks 44A and 44B respectively: these beams are associated with like inclined antenna dipoles such as 46A and 46B all disposed at +45 degrees to the vertical and therefore parallel to one another. Similarly, the negative polarisation antenna beam tilt angle controls TA(−)A and TA(−)B for both antenna assemblies 42A and 42B are adjusted in this embodiment so that the same common tilt angle is obtained for both negative polarisation antenna beams associated with like inclined antenna dipoles such as 48A and 48B disposed parallel to one another at −45 degrees to the vertical. However, the tilt angles for the positive and negative polarisation antenna beams are not necessarily equal, and will in general be set to be different to one another: these beams implement transmission and reception for respective base stations, for which they give different coverage of the ground by virtue of their differing tilt angles. Signals associated with common tilt angles and common base stations are indicated by arrows 70 and pairs of adjacent dotted lines 72.

A first transmit (TX1) signal 74A from a first base station (not shown) for transmission from the first antenna stack 44A with positive or +45 degrees polarisation at a first tilt angle is filtered by a transmit band pass filter (TX) 52A in a TX/RX filter unit 53A, from which it is output to positive polarisation dipoles such as 46A of the first antenna stack 44A. A first receive (RX1) signal received by the first antenna stack 44A with positive polarisation at the first tilt angle is filtered by a receive band pass filter (RX) 78A in the TX/RX filter unit 53A, from which it is output at 76A to the first base station. A further receive (RX2D) signal is received at a second tilt angle with negative −45 degrees polarisation by negative polarisation dipoles such as 48A of the first antenna stack 44A: this signal is output at 80A to a second base station (not shown), for which it provides space diversity when in combination with other signals associated with the second antenna stack 44B.

Similarly, a second transmit (TX2) signal 74B from the second base station for transmission from the second antenna stack 44B with negative or −45 degrees polarisation at the second tilt angle is filtered by a transmit band pass filter (TX) 52B in a TX/RX filter unit 53B, from which it is output to negative polarisation dipoles such as 48B of the second antenna stack 44B. A second receive (RX2) signal 76B is received by the second antenna stack 44B with negative polarisation at the second tilt angle, and is filtered by a receive band pass filter (RX) 78B in the filter unit 53B, from which it is output to the second base station. A further receive (RX1D) signal 80B is received by the second antenna stack 44B with positive −45 degrees polarisation at the first tilt angle: this signal is output to the first base station, for which it provides space diversity when in combination with other signals associated with the first antenna stack 44A.

TX1, RX1 and RX1D signals 74A, 76A and 80B associated with the first tilt angle are grouped to the left of central dotted line 72, and TX2, RX2 and RX2D signals 74B, 76B and 80A associated with the second tilt angle are grouped to the right of that line.

As has been said, the positive polarisation tilt angles of both antenna assemblies 42A and 42B are adjusted to be the same; similarly, the negative polarisation tilt angles of both antenna assemblies 42A and 42B are adjusted to be the same. Signals 74A (TX1), 76A (RX1) and 80B (RX1D) are therefore associated with a first common angle of antenna beam electrical tilt, and signals 74B (TX2), 76B (RX2) and 80A (RX2D) are associated with a second such angle: this is referred to as "co-polarisation tilt coupling" existing between antenna assemblies 42A and 42B.

Alternatively, "anti-polarisation tilt coupling" (coupling/equality between tilt angles associated with different polarisations) between antenna assemblies 42A and 42B may be implemented by adjusting the respective tilt angle associated with each ((+) or (−)) polarisation of one antenna assembly 42A or 42B to be the same as the tilt angle associated with the respective opposite ((−) or (+)) polarisation of the other antenna assembly 42B or 42A.

The embodiment 40 of the invention described with reference to FIG. 2 has the following advantages:

(a) compared to a prior art space diversity antenna system (e.g. as described with reference to FIG. 1), the embodiment 40 adds a second transmit signal with a different carrier frequency and a different angle of electrical tilt which is adjustable independently of the angle of a first such signal used in the prior art—the different frequency and angle of electrical tilt are useable to implement a different cellular radio standard and/or to add a different operator: this is achieved without the need to provide additional antenna assemblies. Consequently, the second transmit signal is added without increasing the antenna system's visual impact on the environment and without requiring consent from regulatory (planning or zoning) authorities;

(b) independent adjustment of signal polarisation is achieved with little increase in cost;

(c) a prior art antenna system may be adapted to implement advantages (a) and (b) above without incurring significant increase in cost and weight, a capability which allows prior art mast and antenna support structures to be retained;

(d) the embodiment 40 adds the second transmit signal (TX2) with a different carrier frequency using a different antenna stack 44B compared to the antenna stack 44A used for the first such signal (TX1); it does not require to combine signals using a 3 dB hybrid combiner, which incurs 50% power loss and is a feature of prior art antenna systems using contiguous frequencies (as will be described later): the second transmit signal's carrier frequency may therefore be contiguous with that of the first transmit signal without this 50% power loss; and (e) the embodiment 40 may implement tilt angles with either co-polarisation coupling or anti-polarisation coupling, which provides a degree of freedom to enable reduction in inter-modulation products generated between signals with different carrier frequencies.

Figure 3:
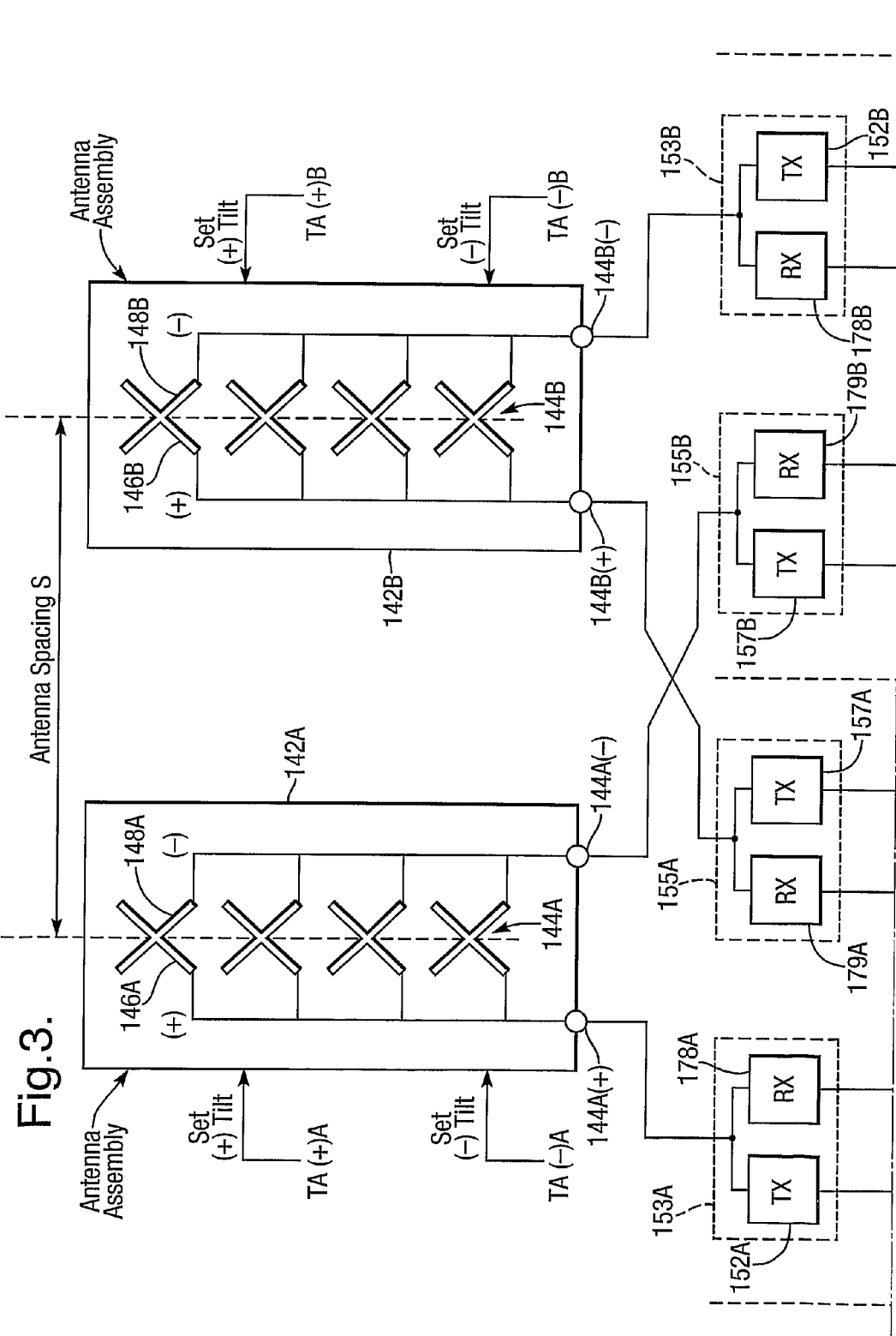
FIG. 3 is a modified version of FIG. 2 suitable for four base stations all with receive signal space diversity.

Referring now to FIG. 3, there is shown a further antenna system 140 of the invention which is a modified version of that described with reference to FIG. 2: it provides capability for use by four base stations (with respective carrier frequencies) sharing antenna assemblies, two tilt angles and co-polarisation or anti-polarisation tilt coupling as required. Here again, to simplify the drawing conventional items are not shown. Parts equivalent to those described earlier are like referenced—with a prefix 100 where numerically referenced. The antenna system 140 is equivalent to the system 40 described earlier with filtering and splitting to define additional signals.

The antenna system 140 has first and second antenna assemblies 142A and 142B with first and second dual polarised antenna stacks 144A and 144B respectively. The first antenna stack 144A has orthogonal input/output ports 144A(+) and 144A(−) connected to positive polarisation dipoles such as 146A and negative polarisation dipoles such as 148A respectively. Similarly, the second antenna stack 144B has orthogonal input/output ports 144B(+) and 144B(−) connected to positive polarisation dipoles such as 146B and negative polarisation dipoles such as 148B respectively.

The first antenna assembly 142A has positive polarisation dipoles (e.g. 146A) connected to a first TX/RX filter unit 153A, and negative polarisation dipoles (e.g. 148A) connected to a second TX/RX filter unit 155B; similarly, the second antenna assembly 142B has positive polarisation dipoles (e.g. 146B) connected to a third TX/RX filter unit 155A, and negative polarisation dipoles (e.g. 148B) connected to a fourth TX/RX filter unit 153B. I.e. as before in the system 40, each antenna assembly 142A or 142B has its two dipole polarisations associated with different tilt angles indicated by different sides of a central dotted line 172c.

The TX/RX filter units 153A, 155A, 153B, 155B contain respective combinations of transmit (TX) and receive (RX) band pass filters 152A and 178A, 157A and 179A, 152B and 178B, 157B and 179B. Four base stations are indicated by arrows BS1, BS2, BS3 and BS4: they operate on different carrier frequencies to provide transmit signals 174A (TX1), 175B (TX2), 175A (TX3) and 174B (TX4) respectively. Transmit signals 174A and 175B are filtered at 152A and 157B, and are then fed respectively to positive (+45 degrees) polarisation dipoles (e.g. 146A) and negative (−45 degrees) polarisation dipoles (e.g. 148A) of the first antenna stack 144A. Similarly, transmit signals (TX3) 175A and (TX4) 174B are filtered at 157A and 152B, and are then fed respectively to positive (+45 degrees) polarisation dipoles (e.g. 146B) and negative (−45 degrees) polarisation dipoles (e.g. 148B) of the second antenna stack 144B.

Receive (RX) band pass filters 178A, 179A, 178B and 179B are connected to respective two way splitters S1, S3, S2 and S4. Signals received by the first antenna stack 144A at positive (+45 degrees) polarisation dipoles (e.g. 146A) are filtered at 178A: these signals are then split at S1 to define a receive (RX1) signal 176A for the first base station BS1 and a receive space diversity (RX3D) signal 190A for the third base station BS3. Similarly, signals received by the first antenna stack 144A at negative (−45 degrees) polarisation dipoles (e.g. 148A) are filtered at 179B: they are then split at S2 to define a receive (RX2) signal 192A for the second base station BS2 and a receive space diversity (RX4D) signal 194A for the fourth base station BS4.

Signals received by the second antenna stack 144B at positive (+45 degrees) polarisation dipoles (e.g. 146B) are filtered at 179A: they are then split at S3 to define a receive (RX3) signal 176B for the third base station BS3 and a receive space diversity (RX1D) signal 180B for the first base station BS1.

Similarly, signals received by the second antenna stack 144B at negative (−45 degrees) polarisation dipoles (e.g. 148B) are filtered at 179B: they are then split at S4 to define a receive (RX4) signal 192B for the fourth base station BS4 and a receive space diversity (RX2D) signal 194B for the second base station BS2.

The splitters S1 to S4 consequently provide for each base station to receive two respective receive signals associated with different antenna stacks but with space diversity and corresponding to like polarisations (co-polarisation tilt coupling) when received. Alternatively, anti-polarisation tilt coupling may be implemented instead as described previously.

The first and second antenna assemblies 142A and 142B have positive polarisation antenna beam tilt angle controls TA(+)A and TA(+)B: these controls are adjusted so that a tilt angle (a) is obtained which is the same as or common to the positive polarisation antenna beams of both antenna stacks 144A and 144B. Consequently, signals associated with the first and third base stations BS1 and BS3 correspond to the same antenna beam tilt angle, these being transmit signals 174A (TX1) and 175A (TX3), receive signals 176A (RX1) and 176B (RX3), and receive space diversity signals 180B (RX1D) and 190A (RX3D).

The first and second antenna assemblies 142A and 142B similarly have negative polarisation antenna beam tilt angle controls TA(−)A and TA(−)B adjusted for a common tilt angle (b) to be obtained for negative polarisation antenna beams of both antenna stacks 144A and 144B. Signals associated with the second and fourth base stations BS2 and BS4 therefore correspond to the tilt angle (b), i.e. transmit signals 175B (TX2) and 174B (TX4), receive signals 192A (RX2) and 192B (RX4), and receive space diversity signals 194B (RX2D) and 194A (RX4D).

As has been said, the antenna system 140 provides capability for use by four base stations (with respective carrier frequencies). This is because it has two antenna assemblies 142A and 142B each with a pair of mutually orthogonal input/output ports 144A(+) and 144A(−), 144B(+) and 144B(−). Consequently a signal input to any one of these ports is effectively isolated from—and therefore will not significantly affect—signals input to the other ports. In general, the four ports 144A(+), 144A(−), 144B(+) and 144B(−) enable up to four RF carrier frequencies to share the antenna system 140 without the need for signal combining using 3 dB couplers or filter combiners (a well known problem in the prior art). This makes the antenna system 140 also suitable for use with the following:
  (a) three base stations, one of which is arranged for transmit space diversity in addition to receive space diversity, and
  (b) two base stations, both of which are arranged for transmit space diversity in addition to receive space diversity.

The embodiment 140 of the invention described with reference to FIG. 3 has the advantages of the system 40 and in addition the following:
  (a) the embodiment 140 adds third and fourth transmit signals with different carrier frequencies without requiring to combine signals using filter combiners or 3 dB hybrid combiners;
  (b) additional transmit signals with different carrier frequencies may be added using filter combiners but without 3 dB hybrid combiners; and
  (c) the option of transmit space diversity for any of the carrier frequencies is available.

Further base stations (or carrier frequencies) having contiguous frequencies may be added to the embodiments described with reference to FIGS. 2 and 3 without incurring combining loss in a 3 dB combiner (which is a feature of prior art contiguous frequency combining): this may be implemented using an individual tilt method described in published International Application No. WO 03/043127.

Other embodiments of the invention will be described later. Before doing so, an explanation will be given of the expressions contiguous frequencies and non-contiguous frequencies which are relevant to these and earlier embodiments.

In an antenna system which operates with multiple carrier frequencies it is necessary to ensure that a transmitter generating a first frequency does not receive a second frequency, particularly if the two frequencies are close to one another. Coupling of a second signal frequency to a transmitter output results in intermodulation products being generated in the transmitter's output stage which is non-linear. These products become uncontrolled spurious emissions which, if large enough, can exceed the level permitted by authorities which regulate communications. Conventionally, filters are used to isolate transmitters from one another, so that a signal cannot propagate from one transmitter to another without passing through a filter which greatly attenuates it. In order to allow isolating filters to be used in this way, adjacent signal frequencies must be separated sufficiently so that filter pass bands do not overlap significantly: i.e. signal frequencies must be "non-contiguous".

Furthermore, in a Wide Band Code Division Multiple Access (WCDMA) system it is preferable that each receiver in a base station has a minimum of unwanted signals in its pass band in order to maximise its sensitivity and dynamic range for wanted signals. It is therefore preferable to filter signals at the base station receiver input to restrict these signals to frequencies within a band for which the base station is intended.

If isolating filters are not adequate, some other form of signal isolation must be provided: this is the case for the Third Generation Frequency Division Duplex (3G FDD) frequency bands allocated by the United Kingdom (UK) Radiocommunications Agency for use by UK network operators. Here there is a spectrum allocation of 2110.3 MHz to 2169.7 MHz for FDD transmission from base-stations, and 1920.3 MHz to 1979.7 MHz for transmission from mobile radios. These allocated spectral regions or bands are each divided into sub-bands 10-15 MHz in width and centre to centre spacing: consequently, the width and centre to centre spacing are less than 1% of the frequency of ~2 GHz. Isolating filters are not adequate for adjacent frequencies with this spacing, because filters are not perfect: i.e. filters do not have infinitely sharp cut-off filter characteristics. This causes adjacent pairs of pass bands to overlap seriously because the filter characteristics have finite slope: it gives rise to two deleterious effects, increased signal loss in the overlap region and reduced isolation between signals. It results in (a) loss in signal coupling and distortion of signal waveform, and (b) a proportion of each signal coupling to adjacent filters and hence to other transmitters. Coupling of a signal from one transmitter into the output of another transmitter results in intermodulation products as has been said and should be strictly avoided.

In the prior art two forms of additional signal isolation are known (a) use of a 3 dB coupler (which unfortunately gives 50% power loss), and (b) air combining. Air combining involves use of (i) multiple antennas or alternatively (ii) a multi-element antenna with orthogonal inputs. To implement (ii), contiguous frequency signals are divided into two groups both with non-contiguous frequencies, and the groups are fed to different inputs with mutual orthogonality ensuring that there is no combining of contiguous frequency signals within the antenna; instead, combining occurs when signals have been radiated from the antenna. Examples of (a) and (b) include: (a) U.S. Pat. No. 5,229,729 and U.S. Pat. No. 5,584,058, (b)(i) U.S. Pat. No. 5,584,058 and (b)(ii) published International Application No. WO 02/082581.

In this specification therefore, signal frequencies are referred to as "non-contiguous" if they are sufficiently far apart to be separated adequately using conventional filters, and as "contiguous" if they are not.

Referring now to FIG. 4, there is shown a further antenna system 240 of the invention which is equivalent to that described with reference to FIG. 2 but illustrated in more detail: it provides capability for two of each of the following, carrier frequencies, independently adjustable tilt angles, channels, feeders and base stations, and it can be used with contiguous frequencies and co-polarisation or anti-polarisation tilt coupling as required.

The system 240 has first and second base stations BS41 and BS42 defining respective channels CH1 and CH2. The first base station BS41 has two ports P41 and P41D: one port P41 is for first transmit and receive (TX1/RX1) signals, and the other port P41D is for first space diversity receive (RX1D) signals only. Similarly, the second base station BS42 has two ports P42 and P42D for second transmit and receive (TX2/RX2) signals, and for second space diversity receive (RX2D) signals.

The expressions "narrow band" and "broad band" will be used in relation to filters in the description of this and later embodiments: "narrow band" means a sufficiently narrow pass band to pass only one (e.g. TX1) of a number of transmit frequencies in the case of transmit filters or only one (e.g. RX1) of a number of receive frequencies in the case of receive filters; "broad band" means a sufficiently broad pass band to pass more than one at least or all transmit frequencies in the case of transmit (TX) filters or more than one at least or all receive frequencies in the case of receive (RX) filters.

The first transmit (TX1) signal passes from the first base station BS41 via port P41 to a base station filter assembly 250 co-located with the base stations BS41 and BS42 (e.g. at the foot of an antenna mast). This signal is filtered by a narrow band transmit band pass filter (TX1) 252A in a TX1/RX12 filter unit 253A; it is then output to a first feeder F41 which transfers it to a first antenna assembly 254A. Here it is filtered by a broad band transmit filter (TX) 256A and then output to a first corporate feed network 243A, which feeds it to like-polarised antenna dipole elements such as 246A of a first antenna stack 244A. The network 243A converts this transmit signal into a set of antenna element signals and feeds them to respective dipole elements of like polarisation (+45 degrees). The first antenna stack 244A comprises a vertical array of crossed dipoles such as 246A and 248A with mutually orthogonal polarisations disposed respectively at +45 and −45 degrees to the vertical and slanting upwards to the right and left, and designated positive (+) polarisation and negative (−) polarisation respectively. The first corporate feed network 243A consequently relays the transmit signal to positive polarisation dipoles (+45 degrees) such as 246A for radiation into free space.

Negative polarisation dipoles such as 248A of the first antenna stack 244A are connected to a second corporate feed network 245A.

Signals received by the first antenna stack 244A in dipoles such as 246A and 248A with mutually orthogonal polarisations pass via corporate feed networks 243A and 245A to narrow band receive filters 258A and 260A, which have pass bands defining first and second receive frequencies (RX1 and (RX2) respectively associated with different polarisations of the same antenna stack 244A. Differing frequency receive signals output from these filters are amplified by LNAs 262A and 264A and then combined by a signal combiner 266A. The combiner 266A provides a combined signal which is filtered by a broad band receive filter 268A with a pass band (RX12) which passes both first and second receive frequencies (RX1, RX2); the resulting combined and filtered signal is input to the first feeder F41, which transfers it to the base station filter assembly 250, where it is filtered in a broad band receive filter 270A and split by a splitter 272A. The splitter 272A provides two receive signals for space diversity purposes, these signals being amplified by LNAs 274A and 276A and filtered by narrow band filters 278A and 280A with different pass bands (RX1 and RX2) before passing respectively to first base station transmit and receive (TX1/RX1) port P41 and second base station space diversity receive (RX2D) port P42D.

Similarly, a second transmit (TX2) signal passes from the second base station BS42 via port P42 to the base station filter assembly 250. This signal is filtered by a narrow band transmit band pass filter (TX2) 252B in a TX1/RX1 filter unit 253B; it is then output to a second feeder F42 which transfers it to a second antenna assembly 254A. Here it is filtered by broad band transmit band pass filter (TX) 256B and then output to a corporate feed network 245B, which feeds it to like-polarised antenna dipole elements such as 248B of a second antenna stack 244B. The network 245B converts this transmit signal into a set of antenna element signals for like polarised dipoles of the second antenna stack 244B, which comprises a vertical array of crossed dipoles equivalent to those of the first antenna stack 244A. The transmit signal consequently passes via the corporate feed network 245B to negative polarisation (−45 degrees) dipoles such as 248B for radiation into free space.

Signals received by the second antenna stack 244B in dipoles such as 246B and 248B with mutually orthogonal polarisations pass via corporate feed networks 243B and 245B to narrow band receive filters 258B and 260B having pass bands defining first and second receive frequencies (RX1 and (RX2), and thence to LNAs 262B and 264B respectively: after output from the LNAs 262B and 264B, these differing receive frequency signals are combined by a signal combiner 266B and filtered by a broad band receive filter 268B with a pass band (RX12) which passes both first and second receive frequencies (RX1 and (RX2); the resulting combined and filtered signal is input to the second feeder F42. The second feeder F42 transfers the combined and filtered signal to the base station filter assembly 250, which filters it in a broad band receive filter 270B and splits it by means of a splitter 272B. Two split signals for space diversity purposes are consequently output from the splitter 272B, and these are amplified by LNAs 274B and 276B and filtered by narrow band filters 278B and 280B with different pass bands (RX1 and RX2) before passing respectively to second base station transmit and receive (TX2/RX2) port P42 and first base station space diversity receive (RX1D) port P41D.

The antenna stacks 244A and 244B have positive polarisation antenna beam tilt angle controls TA(+)A and TA(+)B and negative polarisation antenna beam tilt angle controls TA(−)A and TA(−)B. They consequently may be arranged for co-polarisation tilt coupling or anti-polarisation tilt coupling as required.

Each feeder F41 or F42 carries a single transmit signal, together with a respective receive signal for each polarisation of the antenna; i.e. the first feeder F41 carries one transmit signal TX1 and two receive signals RX1 and RX2D, and the second F42 carries one transmit signal TX2 and two receive signals RX2 and RX1D.

Filtering specific to each base station's signals is provided by the antenna assemblies 254A and 254B and the base station filter assembly 250. The base station filter assembly 250 in particular isolates first receive and receive diversity signals RX1 and RX1D for the first base station and second receive and receive diversity signals RX2 and RX2D for the second base station. Transmit signals TX1 and TX2 are radiated by separate antenna stacks 244A and 244B with an antenna coupling loss at least 40 dB, and in consequence the TX1 and TX2 filters for these signals may (optionally) be equivalent. The use of separate antenna stacks 244A and 244B for the transmit signals TX1 and TX2 also means that the carrier frequencies of these signals may be contiguous, because the signals are not combined in the circuitry illustrated but instead in air.

Referring now to FIG. 5, there is shown a further antenna system 340 of the invention which is a simplified version of that described with reference to FIG. 4. It is equivalent to the earlier embodiment 240 with the sole exception that the base station filter assembly 250 is replaced by a simplified equivalent comprising a combination of two duplex filters 343A and 343B associated with first and second base stations BS51 and BS52 respectively. It is for use with receive signals having non-contiguous carrier frequencies separable by conventional filters as discussed earlier (its transmit signals need not be non-contiguous). Co-polarisation or anti-polarisation tilt coupling may be implemented as required. Parts equivalent to those described earlier are like referenced—with a prefix 300 replacing 200 where numerically referenced. Description will be directed to aspects of difference between the embodiments 340 and 240.

The first duplex filter 343A has a narrow band transmit filter (TX1) 352A for band limiting a TX1 signal from a first base station BS51; this TX1 signal is for transmission from positive polarisation antenna dipoles such as 346A of a first antenna stack 344A. The first duplex filter 343A also has two narrow band receive signal filters 378A and 380A, which respectively provide a receive signal (RX1) at a first frequency for the first base station BS51 and a space diversity receive signal (RX2D) at a second frequency for the second base station BS52. The first frequency receive signal (RX1) is derived from positive polarisation antenna dipoles such as 346A of the first antenna stack 344A. The second frequency space diversity receive signal (RX2D) is derived from negative polarisation antenna dipoles such as 348A of the first antenna stack 344A. These receive signals have non-contiguous carrier frequencies, and are therefore separable by conventional filters 378A and 380A without significant problems associated with intermodulation product frequencies.

Similarly, the second duplex filter 343B has a narrow band transmit filter (TX2) 352B for band limiting a TX2 signal from a second base station BS52; this TX2 signal is for transmission from negative polarisation antenna dipoles such as 348B of a second antenna stack 344B. The second duplex filter 343B also has two receive signal filters 378B and 380B, which respectively provide a receive signal (RX2) at a second frequency for the second base station BS52 and a space diversity receive signal (RX1D) at a first frequency for the first base station BS51. The second frequency receive signal (RX2) is derived from negative polarisation antenna dipoles such as 348B of the second antenna stack 344B. The first frequency space diversity receive signal (RX1D) is derived from positive polarisation antenna dipoles such as 346B of the second antenna stack 344B. These receive signals have filter-separable non-contiguous carrier frequencies. Each of the base stations BS51 and BS52 therefore generates one transmit signal and obtains two receive signals with space diversity with respect to one another.

The embodiment 340 represents a simplification compared to that described with reference to FIG. 4, because it has a reduced number of filters.

Referring now to FIG. 6, there is shown a further antenna system 440 of the invention with two base stations, i.e. first and second base stations BS61 and BS62, and three feeders F61, F62 and F63; it is suitable for use with contiguous frequencies and co-polarisation or anti-polarisation tilt coupling is available. The antenna system 440 has antenna assemblies 454A and 454B largely as described with reference to FIGS. 3 and 4 for antenna assemblies 254A, 254B, 354A and 354B. The antenna assemblies 454A and 454B of FIG. 6 are equivalent to those of earlier embodiments 240 and 340 with the sole exception that receive signals associated with pairs of corporate feeds 443A, 445A and 443B, 445B in respective antenna stacks 444A and 444B are no longer combined on respective single feeders F61 and F62. Description will be directed to aspects of difference compared to earlier embodiments 340 and 240. Numerically referenced parts equivalent to those described earlier are like referenced with a prefix 400 replacing 200 or 300.

First corporate feeds 443A and 445A in the first antenna stack 444A are associated respectively with positive and negative polarisation antenna dipoles such as 446A and 448A. Likewise, second corporate feeds 443B and 445B in the second antenna stack 444B are also associated respectively with positive and negative polarisation antenna dipoles such as 446B and 448B.

The positive polarisation (+) corporate feed 443A in the first antenna stack 444A is associated with transmit and receive filters 456A, 458A and 468A with pass bands at first transmit (TX1) and receive (RX1) frequencies and a single LNA 462A. Transmit and receive signals pass via the filters 456A, 458A or 468A to and from the corporate feed 443A and first base station BS61 via the first feeder F61.

Similarly, the negative polarisation (−) corporate feed 445B in the second antenna stack 444B is associated with transmit and receive filters 456B, 458B and 468B with pass bands also at first transmit (TX1) and receive (RX1) frequencies and a single LNA 462B. Transmit and receive signals pass via the filters 456A, 458A or 468A to and from the corporate feed 445B and second base station BS62 via the second feeder F62.

The negative polarisation (−) corporate feed 445A in the first antenna stack 444A is associated with a receive filter 460A with a pass band at a second receive (RX2) frequency and an LNA 464A. A receive signal passes via the filter 460A and LNA 464A from the corporate feed 445A to a combiner 471 and thence to a third feeder F63. Likewise, the positive polarisation (+) corporate feed 443B in the second antenna stack 444B is associated with a receive filter 460B with a pass band at the first receive (RX1) frequency and an LNA 462B. A receive signal passes via the filter 460B and LNA 462B from the corporate feed 443B to the combiner 471 and thence to the third feeder F63. Receive signals associated with different antenna assemblies 454A and 454B, different (mutually orthogonal) dipole polarisations and different (RX1 and RX2) frequencies are therefore combined on the third feeder F63.

A splitter 473 splits the combined receive signal output from the third feeder F63: split signals which result are amplified by LNAs 475 and 477 and band limited by receive filters 479 and 481 with pass bands at the first and second receive frequencies (RX1 and RX2) respectively. The outputs of these filters provide first and second receive space diversity signals (RX1D and RX2D) for the first and second base stations BS61 and BS62 respectively.

The embodiment 440 only requires ten filters 456A, 456B etc. by virtue of its use of the third feeder F63 for space diversity receive signals. The third feeder F63 does not carry transmit signals, which are of much higher power than receive signals, and consequently this feeder F63 may be of smaller diameter and higher loss compared to the first and second feeders F61 and F62. Acceptable power loss for the third feeder F63 is limited by the gain and dynamic range of the LNAs 464A and 462B and the height at which the antenna assemblies 454A and 454B are mounted on a conventional antenna support mast (not shown). The third feeder F63 may be enclosed in a common sheath (not shown) with one of the first and second feeders F61 and F62 in order to simulate a two feeder arrangement.

Referring now to FIG. 7, there is shown a further antenna system 540 of the invention which is a simplified version of that described with reference to FIG. 6. It is suitable for use with contiguous frequencies, and co-polarisation or anti-polarisation tilt coupling is available. Parts mentioned below equivalent to those described earlier will not be described but are like referenced—with a prefix 500 replacing 400 where numerically referenced. The system 540 is equivalent to the earlier embodiment 440 with the sole exception that the combiner 471, third feeder F63, splitter 473 and receive filters 479 and 481 are not included. Instead they are replaced by two receive feeders F73 and F74.

A second frequency receive (RX2) signal from a negative polarisation (−) corporate feed 545A in a first antenna stack 544A is filtered at 560A and amplified at 564A; it is then fed via a first receive feeder F73 to a second base station BS72 as a second frequency receive space diversity (RX2D) signal. A first frequency receive space diversity (RX1D) signal for a first base station BS71 is obtained likewise via a positive polarisation (+) corporate feed 543B in a second antenna stack 544B, filter 558B, LNA 562B and second receive feeder F74.

The antenna system 540 uses only eight filters 560A etc., which is due to the use of two receive feeders F73 and F74 for receive space diversity signals (RX1D and RX2D). The antenna system 540 requires no greater number of filters than are normally installed in a typical commercially available antenna assembly for mounting on a support mast and incorporating LNAs. However, filters in a commercially available antenna assembly are broad band, and tilt angle controls are coupled so that positive and negative polarisation beams have the same tilt angle. The invention modifies this to introduce narrow band filtering to distinguish between signals associated with positive and negative polarisations, and decouples tilt angle controls so that positive and negative polarisation beams have independently adjustable tilt angles. In order to reduce visual impact on the environment, the two receive feeders F73 and F74 are shown enclosed in a common sheath 583. A two feeder arrangement may alternatively be simulated by enclosing each receive feeder F73 or F74 with a respective first or second feeder 71 or 72. The antenna assemblies AN1 and AN2 have different filter frequencies in order to reduce the out-of-band emissions from each transmit carrier and also to reduce the out-of-band receive signals appearing at each base station receive port.

Figure 8:
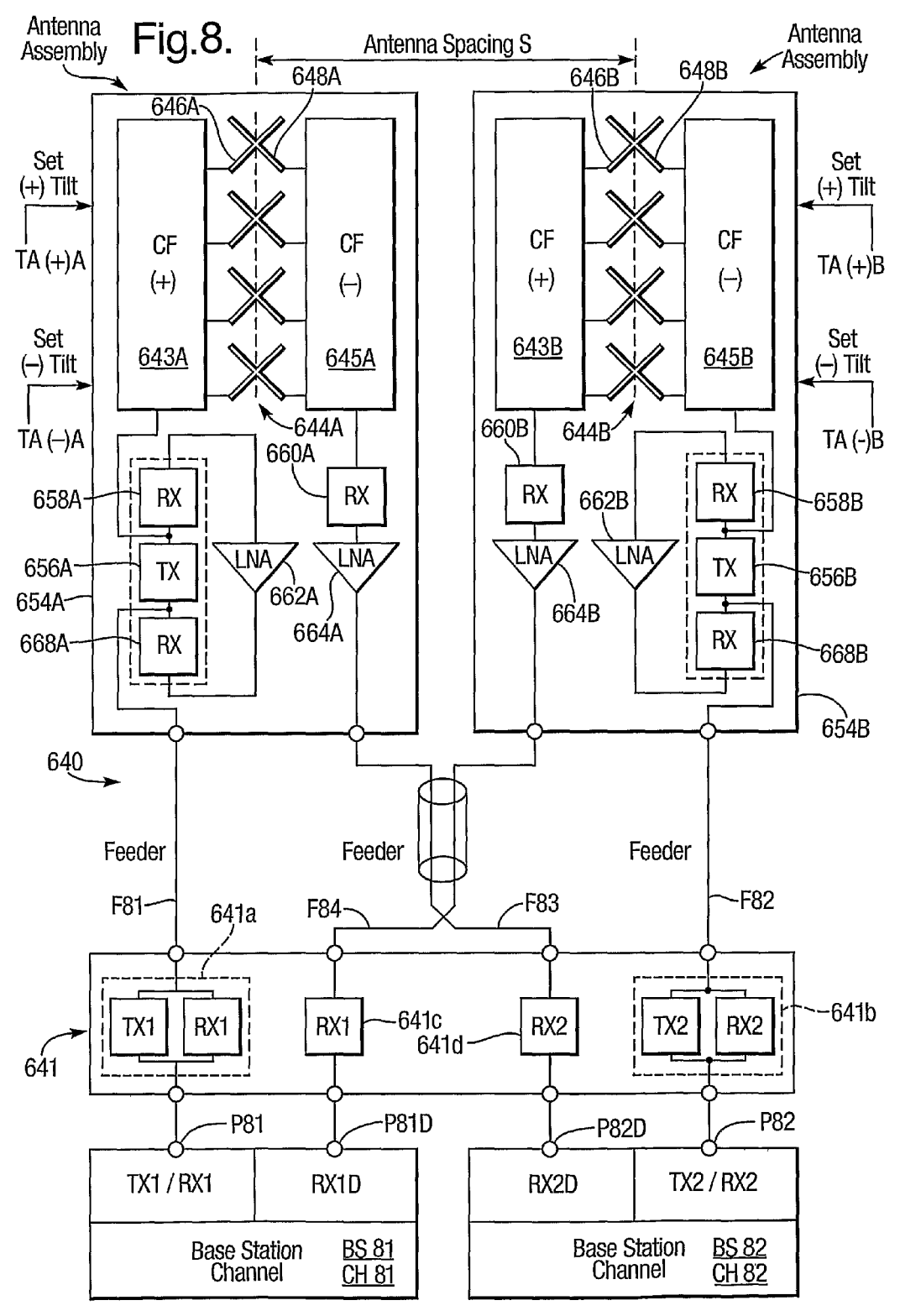

Referring now to FIG. 8, there is shown a further antenna system 640 of the invention which is a modified version of that described with reference to FIG. 7. Numerically referenced parts mentioned below equivalent to those shown in FIG. 7 are like referenced with a prefix 600 replacing 500. The system 640 is suitable for use with contiguous frequencies. It is equivalent to the earlier embodiment 540 with the exception that all transmit and receive filters 656A, 658A, 660A, 656B, 658B and 660B incorporated in antenna assemblies 654A and 654B are relatively broad band. The system 640 is instead rendered frequency selective by means of a filter unit 641 interposed between base stations and feeders, i.e. between base stations BS81 and BS82 and first and second feeders F81 and F82 and receive feeders F83 and F84.

The filter unit 641 has parallel arrangements 641a and 641b of narrow band transmit (TX1, TX2) and receive (RX1, RX2) filters interposed between the base stations BS81 and BS82 and the first and second feeders F81 and F82 respectively. These filters ensure that first transmit and receive frequency (TX1, RX1) signals pass via first base station port P81 and second transmit and receive frequency (TX2, RX2) signals pass via second base station port P82. The filter unit 641 also has narrow band receive (RX1, RX2) filters 641c and 641d which define space diversity receive signals (RX1D, RX2D) for first and second base station space diversity ports P81D and P82D respectively.

The antenna system 640 enables the antenna assemblies 654A and 654B to have like broad band filters including their pass bands, so that antenna assembly design may be standardised and simplified. Transmit and receive signal filtering to define individual frequencies is instead implemented by the filter unit 641 associated with base stations BS81 and BS82 located remotely from the head of an antenna support mast. If required LNAs may be incorporated in the filter unit 641 using a circuit configuration similar to that shown for the antenna assemblies 654A and 654B, but retaining filter frequencies (TX1, RX1, TX2, RX2) specific to respective base stations.

Figure 9:
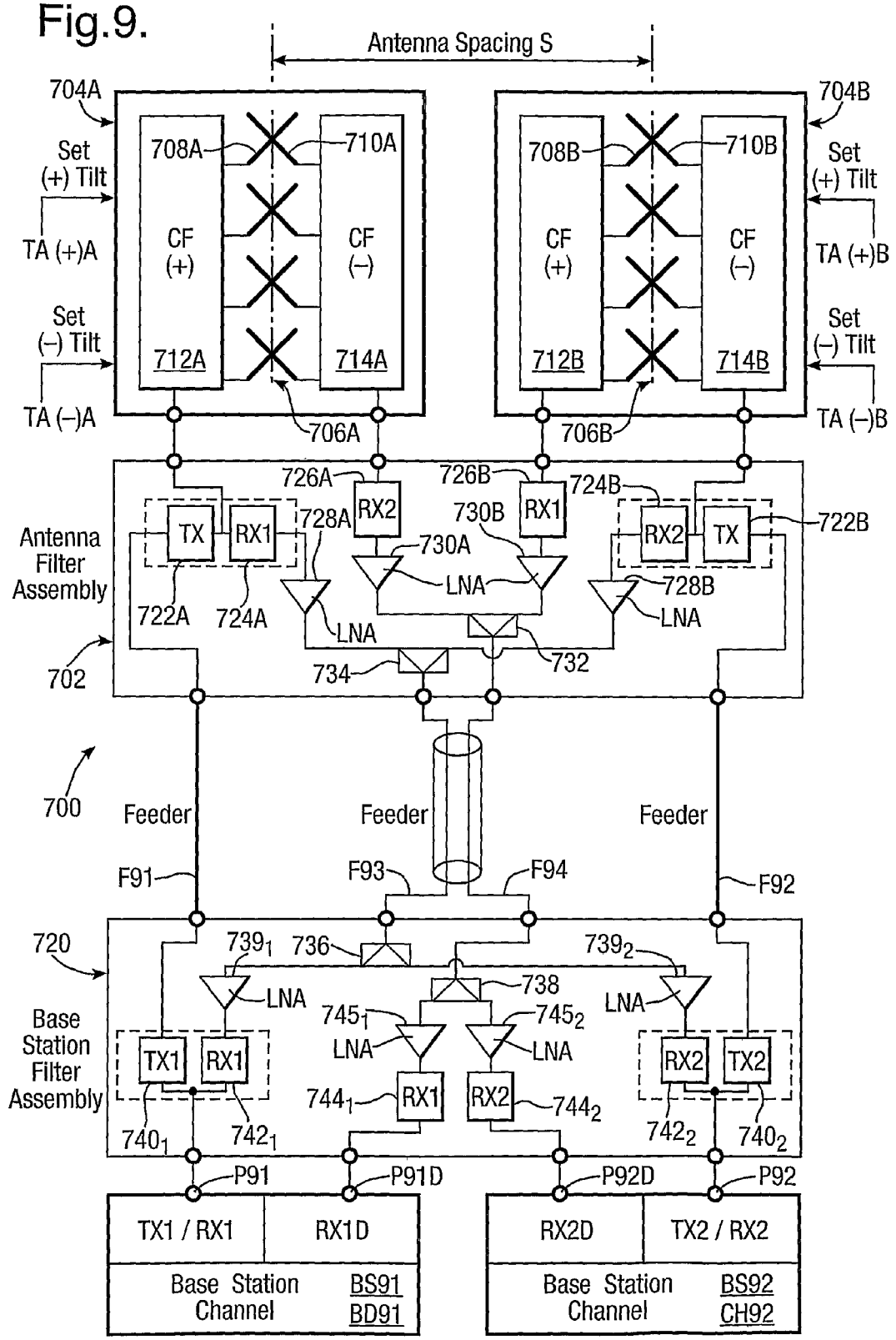
FIG. 9 illustrates a further antenna system of the invention with filters mounted externally of antenna assemblies having simplified construction.

FIG. 9 shows another antenna system 700 of the invention suitable for use with contiguous frequencies while avoiding feeder sharing between transmit and receive signals. Co-polarisation or anti-polarisation tilt coupling is also available. The antenna system 700 has an antenna filter assembly 702 through which all transmit and receive signals pass. The antenna filter assembly 702 is separate from (i.e. mounted externally of) antenna radomes 704A and 704B, which contain respective crossed dipole antenna stacks 706A and 706B. First antenna stack 706A has crossed dipoles such as 708A and 710A with positive (+45 degrees) polarisation and negative (−45 degrees) polarisation connected to corporate feed networks 712A and 714A respectively. Likewise, second antenna stack 706B has crossed dipoles such as 708B (positive polarisation) and 710B (negative polarisation) connected to corporate feed networks 712A and 714A respectively.

The antenna system 700 has first and second base stations BS91 and BS92: the first base station BS91 has a transmit/receive port P91 for transmit and receive (TX1/RX1) signals and a space diversity port P91D for a receive space diversity (RX1D) signal; likewise, the second base station BS92 has a transmit/receive port P92 for transmit and receive (TX2/RX2) signals and a space diversity port P92D for a receive space diversity (RX2D) signal.

Transmit and receive signals pass between the antenna radomes 704A and 704B and the base stations BS91 and BS92 via a series arrangement of the antenna filter assembly 702, first to fourth feeders F91 to F94 in parallel and a base station filter assembly 720.

The antenna filter assembly 702 incorporates two transmit (TX) filters 722A and 722B which are both broad band, i.e. sufficiently broad to pass all transmit frequencies. It also incorporates four receive (RX) filters 724A, 726A, 724B and 726B all of which are narrow band, i.e. sufficiently narrow to pass only a first receive (RX1) frequency or a second receive (RX2) frequency (as indicated thereon) but not both. This assembly also has LNAs 728A, 730A, 728B and 730B for amplifying receive signals. Suffixes A and B for filters and LNAs indicate use for signals passing to or from antenna stacks 706A and 706B respectively. The antenna filter assembly 702 also incorporates combiners 732 and 734 for combining amplified signals filtered by respective pairs of receive filters 724A-724B and 730A-730B. This combining is arranged such that receive signals which are combined are those derived both from different antenna stacks and from dipoles of different polarisation: e.g. combiner 734 combines receive signals derived from positive polarisation dipoles such as 708A of first antenna stack 706A with receive signals derived from negative polarisation dipoles such as 710B of second antenna stack 706B.

The base station filter assembly 720 incorporates transmit and receive filters (TX1, RX1, TX2, RX2) $740_1$, $742_1$, $744_1$, $740_2$, $742_2$ and $744_2$ all of which are narrow band: i.e. these filters are sufficiently narrow to pass only one (TX1 or TX2) of two transmit frequencies in the case of transmit filters $740_1$ and $740_2$, or only one (RX1 or RX2) of two receive frequencies in the case of receive filters $742_1$, $744_1$, $742_2$ and $744_2$. The base station filter assembly 720 also incorporates splitters 736 and 738 for receive signals which have passed down the third and fourth feeders F93 and F94 respectively. The splitters 736 and 738 provide input signals for pairs of LNAs $739_1$-$739_2$ and $745_1$-$745_2$, which in turn provide input signals to receive filters $742_1$-$742_2$ and $744_1$-$744_2$ respectively.

Transmit signals (TX1, TX2) pass from the first and second base stations BS91 and BS92 to the base station filter assembly 720, are filtered by narrow band transmit filters $740_1$ and $740_2$, and pass along the first and second feeders F91 and F92 to the antenna filter assembly 702 for filtering by broad band transmit filters 722A and 722B respectively. They then pass into antenna radomes 704A and 704B for radiation from positive polarisation dipoles (e.g. 708A) of the first antenna stack 706A and negative polarisation dipoles (e.g. 710B) of the second antenna stack 706B respectively.

Positive polarisation dipoles (e.g. 708A) of the first antenna stack 706A and negative polarisation dipoles (e.g. 710B) of the second antenna stack 706B generate receive signals which are filtered at 724A and 724B and amplified at 728A and 728B respectively and then combined at 734 and fed to the third feeder F93. Output from the third feeder F93 is split at 736 in the base station filter assembly 720, amplified at $739_1$ and $739_2$ and filtered at $742_1$ and $742_2$ to provide receive signals (RX1, RX2) for input to first and second base station transmit/receive ports P91 and P92 respectively.

Similarly, negative polarisation dipoles (e.g. 710A) of the first antenna stack 706A and positive polarisation dipoles (e.g. 708B) of the second antenna stack 706B generate receive signals which are filtered at 726A and 726B and amplified at 730A and 730B respectively, and then combined at 732 and fed to the fourth feeder F94. Output from the fourth feeder F94 is split at 738 in the base station filter assembly 720, amplified at $745_1$ and $745_2$ and filtered at $744_1$ and $744_2$ to provide space diversity receive signals (RX1D, RX2D) for input to first and second base station space diversity ports P91D and P92D respectively.

The antenna system 700 of the invention avoids feeder sharing between transmit signals and between transmit and receive signals: this significantly reduces the magnitude of intermodulation products that would otherwise be generated in feeders. It is also of modular construction which facilitates design: i.e. antenna radomes 704A and 704B are identical modules (ignoring minor manufacturing variations), and are not specific to a particular licensed frequency interval e.g. as licensed (see above) by the United Kingdom (UK) Radiocommunications Agency. Instead the antenna filter assembly 702 defines such a frequency interval (TX or RX), and is a module separate from the radomes 704A and 704B. The base station filter assembly 720 defines individual user frequencies (TX1, TX2) (RX1, RX2) within such a frequency interval: it is another separate module but it is not required to be located at the head of an antenna support mast:—instead it may be co-located with base station equipment as illustrated.

Figure 10:
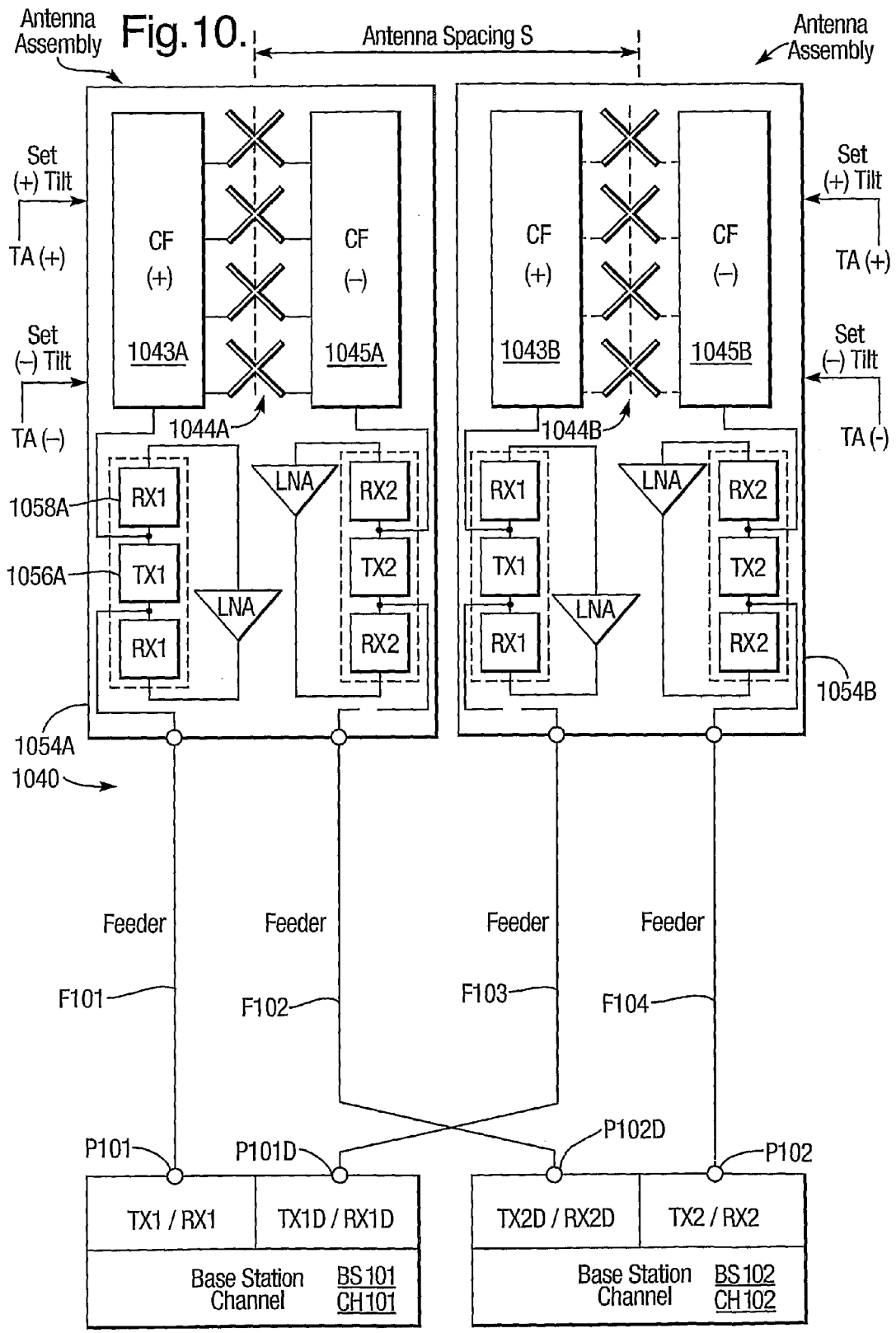
FIG. 10 shows a further antenna system of the invention providing space diversity for both transmit and receive signals of two base stations.

Referring now to FIG. 10, there is shown a further antenna system 1040 of the invention which is a modified version of that described with reference to FIG. 7. It provides for transmit space diversity in addition to receive space diversity. It is suitable for use with contiguous frequencies, and co-polarisation or anti-polarisation tilt coupling is available. Numerically referenced parts (where mentioned below) equivalent to those described earlier are like referenced—with a prefix 1000 replacing 500.

The system 1040 is equivalent to the earlier embodiment 540 with the sole exception that instead of only two (of four) corporate feeds 543A and 545B being connected to both transmit filters and receive filters the antenna system 1040 has four corporate feeds 1043A, 1045A, 1043B and 1045B which are all so connected.

The antenna system 1040 has first and second base stations BS101 and BS102 which both have two transmit/receive ports P101-P101D and P102-P102D for both transmit and receive signals (TX1/RX1, TX2/RX2) and transmit and receive space diversity signals (TX1D/RX1D, TX2D/RX2D). The transmit/receive ports P101, P101D, P102 and P102D are connected via respective feeders F101 to F104 to relay signals between the four corporate feeds 1043A, 1045A, 1043B and 1045B and the base stations BS101 and BS102: this connectivity is such that each base station is associated with two transmit signals with a respective carrier frequency and different antenna stacks 1044A and 1044B and different (mutually orthogonal) dipole polarisations giving space diversity; likewise, each base station is associated with two receive signals with a respective carrier frequency and different antenna stacks 1044A and 1044B also with different dipole polarisations giving space diversity. Consequently, the first and second base stations BS101 and BS102 both have transmit space diversity in addition to receive space diversity, and carrier frequencies differ between the base stations. All four feeders F101 to F104 carry both transmit and receive signals. In other respects construction and operation are equivalent to those described with reference to FIG. 7.

Figure 11:
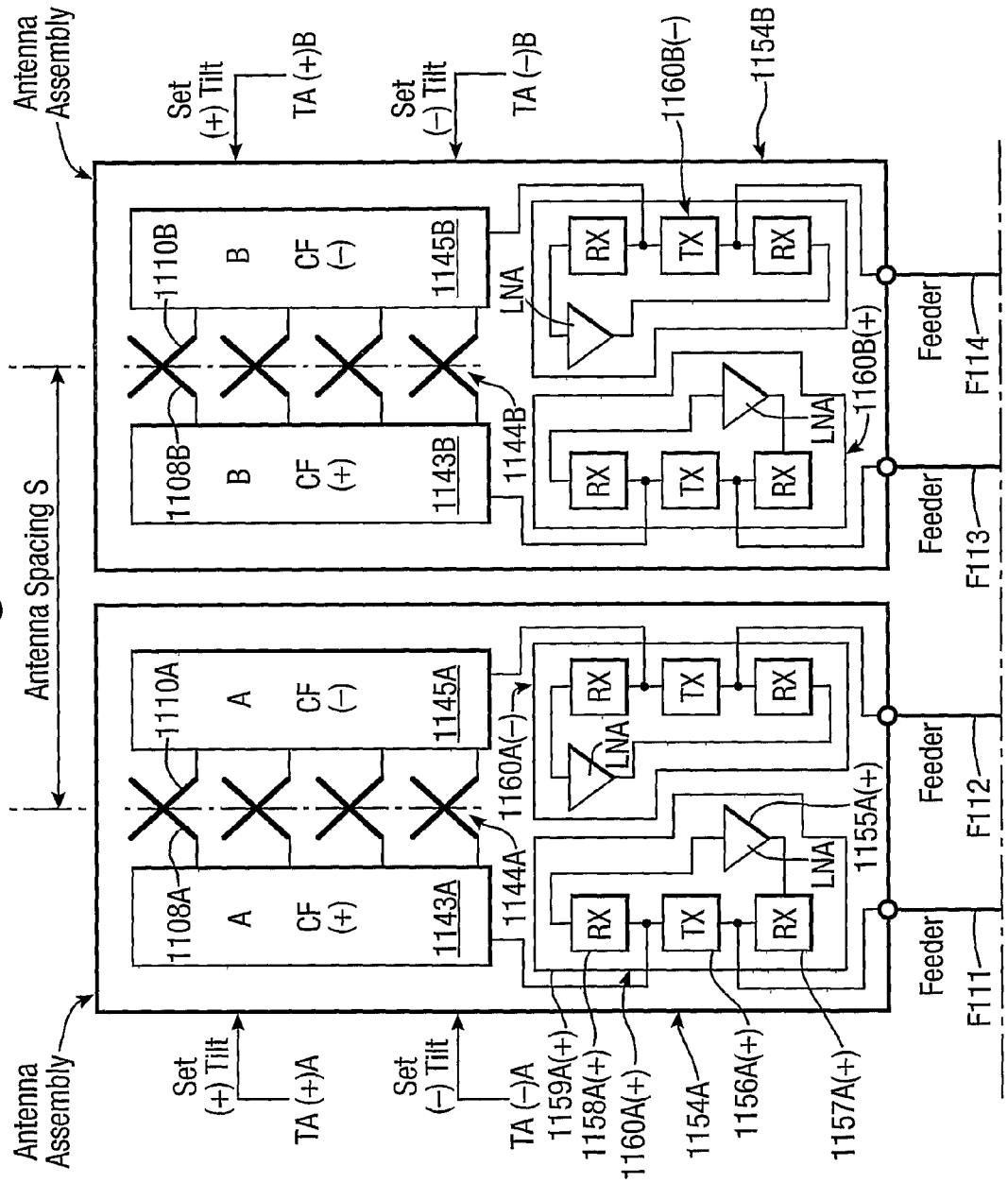
FIG. 11 shows an antenna system of the invention providing space diversity for receive signals of four base stations with two angles of tilt.

FIG. 11 shows a further antenna system 1140 of the invention which is based on systems described earlier, but with modification and extension to provide for first, second, third and fourth base stations BS111 to BS114 each with receive space diversity and sharing two tilt angles. It is also suitable for use with contiguous transmit and receive frequencies because these are routed via different antenna stacks, and co-polarisation or anti-polarisation tilt coupling is available.

The base stations are arranged in adjacent odd numbered and even numbered pairs, i.e. base stations BS111 and BS113 are adjacent one another and so are base stations BS112 and BS114, each adjacent pair being associated with a respective common tilt angle. Each base station operates with a respective transmit frequency and a respective receive frequency: i.e. first, second third and fourth base stations BS111, BS112, BS113 and BS114 operate respectively with first, second third and fourth transmit frequencies TX1, TX2, TX3 and TX4 and also with first, second third and fourth receive frequencies RX1, RX2, RX3 and RX4.

The antenna system 1140 incorporates first and second antenna assemblies 1154A and 1154B with first and second antenna stacks 1144A and 1144B respectively equivalent to the like illustrated in FIG. 10, except that all antenna assembly filters such as 1156A and 1158A are now broad band. The first antenna stack 1144A has positive and negative polarisation dipoles (e.g. 1108A, 1110A) associated with corporate feed networks 1143A and 1145A respectively; likewise, the second antenna stack 1144B has positive and negative polarisation dipoles (e.g. 1108B, 1110B) associated with corporate feed networks 1143B and 1145B respectively. The corporate feed networks 1143A, 1145A, 1143B and 1145B are connected respectively to first, second, third and fourth broad band amplifier/filter units 1160A(+), 1160A(−), 1160B(+) and 1160B(−), which relay signals between these networks and first to fourth feeders F111 to F114 respectively and provide broad band filtering of transmit and receive signals and low noise amplification of receive signals.

The four feeders F111 to F114 connect the four broad band amplifier/filter units 1160A(+), 1160A(−), 1160B(+) and 1160B(−) to first, second, third and fourth narrow band amplifier/filter units 1163/1, 1163/2, 1163/3 and 1163/4 respectively in a base station filter assembly 1163: these narrow band amplifier/filter units are of like construction except that they have filter pass bands which differ at least partially. Unit 1163/1 has a narrow band transmit filter Ta with a pass band at the first transmit frequency (TX1), a first narrow band receive filter Ra1 with a pass band (RX13) which passes the first and third receive frequencies (RX1 and RX3), a second narrow band receive filter Ra2 with a pass band at the first receive frequency (RX1) and a third narrow band receive filter Ra3 with a pass band at the third receive frequency (RX3). The first narrow band receive filter Ra1 may be implemented as two filters in parallel with pass bands for the first and third receive frequencies (RX1 and RX3) respectively.

A first frequency (TX1) transmit signal from the first base station BS111 passes to the first narrow band amplifier/filter unit 1163/1, where it is filtered by the transmit filter Ta and then relayed via the first feeder F111 to the first antenna assembly amplifier/filter unit 1160A(+) for broad band filtering at 1156(+). After filtering at 1156(+), this signal is radiated from the first antenna stack 1144A with positive polarisation.

The first antenna stack 1144A obtains from free space a positive polarisation receive signal which passes to the first amplifier/filter unit 1160A(+) for broad band filtering at 1158(+), amplification at 1155A(+) and further broad band filtering at 1157(+), after which it is input to the first feeder F111. This receive signal passes from the first feeder F111 to the first narrow band amplifier/filter unit 1163/1 for filtering by the first receive filter Ra1 and splitting at Sa into two signals for amplification by first and second LNAs La1 and La2 respectively. Receive signals output from the first and second LNAs La1 and La2 are filtered by the second and third receive filters Ra2 and Ra3, and are then output and cross connected to first and third base stations BS111 and BS113 respectively: this provides a first frequency receive signal (RX1) for the first base station BS111 and a third frequency space diversity receive signal (RX3D) for the third base station BS113.

In a similar manner, other narrow band amplifier/filter units 1163/2 to 1163/4 define other transmit signal frequencies (TX2, TX3, TX4) and other pairs of receive signal frequencies (RX2-RX4, RX3-RX1, RX4-RX2). The four narrow band amplifier/filter units 1163/1 to 1163/4 are connected via the feeders F111 to F114 to broad band amplifier/filter units 1160A(+) to 1160B(−) respectively, and therefore they are associated with different antenna stacks 1144A and 1144B and/or different dipole polarisations (as illustrated). They provide transmit and receive signals at frequencies which differ for different base stations BS111 to BS114, for all four of which they provide receive signals with space diversity. The arrangement is such that the first, second, third and fourth base stations BS111, BS112, BS113 or BS114 operate with first, second, third and fourth transmit/receive frequencies TX1/RX1, TX2/RX2, TX3/RX3 and TX4/RX4 respectively; adjacent odd numbered and even numbered pairs of base stations, i.e. adjacent pair BS111 and BS113 and adjacent pair BS112 and BS114, receive signals from and transmit signals to like-polarised dipoles in different antenna stacks. In this regard first and third base stations BS111 and BS113 are associated with positive polarisation dipoles 1108A and 1108B in antenna stacks 1144A and 1144B respectively, and second and fourth base stations BS112 and BS114 are associated with negative polarisation dipoles 1110A and 1110B in those antenna stacks.

As illustrated, the antenna system 1140 does not show space diversity for transmit signals, as this would undesirably increase illustrational complexity. However, transmit space diversity may easily be obtained in addition to receive space diversity by adding to the four narrow band amplifier/filter units 1163/1 to 1163/4 further transmit filtering with pass band frequencies TX3, TX1, TX4 and TX2 and connected between the first to fourth base station diversity ports P111D to P114D and the first to fourth feeders F1 to F114 respectively. The diversity ports P111D to P114D are then adapted for space diversity transmit/receive frequency pairings TX1D/RX1D, TX2D/RX2D, TX3D/RX3D and TX4D/RX4D respectively.

The antenna assemblies 1154A and 1154B have tilt angle controls such as TA(+)A which are adjusted so that first and third base stations BS111 and BS113 using transmit frequencies TX1 and TX3 (i.e. an odd numbered group of frequencies) share a common first tilt angle (a) as indicated by an arrow $\theta_a$. Likewise, second and fourth base stations BS112 and BS114 using transmit frequencies TX2 and TX4 (i.e. an even numbered group of frequencies) share a common second tilt angle (b) as indicated by an arrow $\theta_b$. Both co-polarisation and anti-polarisation tilt coupling may be implemented. In this embodiment 1140 of the invention, odd numbered and even numbered groups of carrier frequencies (1, 3 and 2, 4) are distinguished inter alia by each group sharing a different tilt angle to that of the other group.

Broad band filters (e.g. 1156(+)) in the antenna assemblies 1154A and 1154B are assumed to have the same pass bands: if so, the transmit (TX) filters such as 1156A(+) must have pass bands wide enough to pass all four transmit carrier frequencies (TX1, TX2, TX3 and TX4) used by the base stations BS111 to BS114; similarly, broad band receive (RX) filters such as 1154A(+) and 1157A(+) must have pass bands wide enough to pass all four transmit carrier frequencies (RX1, RX2, RX3 and RX4) used by the base stations BS111 to BS114. The base station filter assembly 1263 provides isolation between each base station receive frequencies.

Each broad band amplifier/filter unit (e.g. 1160A(+)) is associated with a respective narrow band amplifier/filter unit (e.g. 1163/1) in the base station filter assembly 1163: if the broad band filters (e.g. 1156(+)) in the antenna assemblies 1154A and 1154B have different pass bands, then each broad band filter unit must pass frequencies associated with the respective narrow band amplifier/filter unit.

Figure 12:
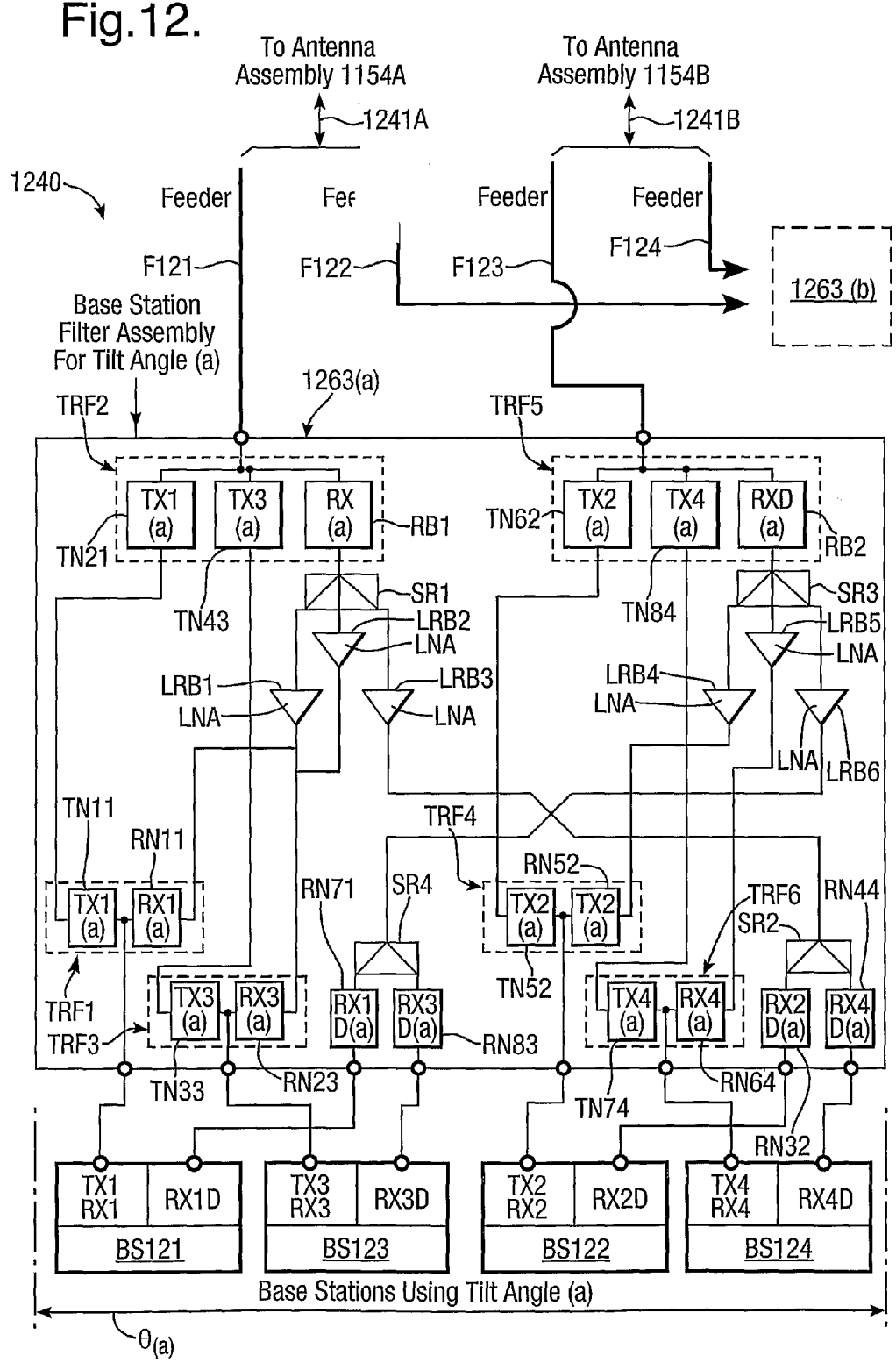
FIG. 12 illustrates an antenna system of the invention providing space diversity for receive signals for eight base stations with two angles of tilt.

FIG. 12 shows a further antenna system 1240 of the invention which is based on systems described earlier, but with modification and extension to provide for first, second third and fourth base stations BS111 to BS114 to share one tilt angle designated (a) and another four base stations (not shown) to share another tilt angle designated (b). Various items in the drawing are labelled or suffixed (a) in the drawing to indicate association with tilt angle (a). The antenna system 1240 is suitable for use with both contiguous and non-contiguous frequencies, because signals which might otherwise give difficulty in this regard are routed separately; moreover co-polarisation or anti-polarisation tilt coupling is available.

The four base stations shown are arranged in adjacent odd numbered and even numbered pairs, i.e. base stations BS111 and BS113 are adjacent one another and so are base stations BS112 and BS114, each adjacent pair being associated with a respective common tilt angle. Each base station operates with a respective transmit frequency and a respective receive frequency: i.e. first, second, third and fourth base stations BS111, BS112, BS113 or BS114 operate with first, second, third and fourth transmit/receive frequencies TX1/RX1, TX2/RX2, TX3/RX3 and TX4/RX4 respectively. Odd numbered base stations BS111 and BS113 are therefore associated with odd numbered frequencies and even numbered base stations BS112 and BS114 with even numbered frequencies. Contiguous frequencies which are numbered 1 to 4 in sequence therefore correspond to two groups of non-contiguous frequencies, one group with odd numbered (1 and 3) frequencies and the other group with even numbered (2 and 4) frequencies.

The antenna system 1240 incorporates first and second antenna assemblies 1154A and 1154B (not shown in this drawing) as illustrated in and as described with reference to FIG. 11. As indicated by arrows 1241A and 1241B, these antenna assemblies are connected to first, second, third and fourth feeders F121, F122, F123 and F124 in the same way as first to fourth feeders F111 to F114 respectively are shown connected in FIG. 11.

The first and third feeders F121 and F123 are connected to a first base station filter assembly 1263($a$) associated with tilt angle (a) indicated by an arrow $\theta_{(a)}$; the second and fourth feeders F122 and F124 are connected to a second base station filter assembly 1263($b$) indicated by a chain line square: it is of like construction to the first base station filter assembly 1263($a$) except that it has different filter pass bands and that it is associated with tilt angle (b).

A first frequency (TX1) transmit signal from the first base station BS121 passes to the first base station filter assembly 1263($a$), where it is filtered by first and second narrow band transmit filters TN11 and TN21 incorporated in first and second transmit/receive filter units TRF1 and TRF2 respectively; it is then relayed via the first feeder F121 to the first antenna assembly 1154A for processing as described with reference to FIG. 11 and radiation from the first antenna stack 1144A with positive polarisation.

Similarly, a third frequency (TX3) transmit signal from the third base station BS123 passes to the first base station filter assembly 1263($a$) for filtering by third and fourth narrow band transmit filters TN33 and TN43 incorporated in a third and the second transmit/receive filter units TRF3 and TRF2 respectively; it is then relayed via the first feeder F121 to the first antenna assembly 1154A for radiation from the first antenna stack 1144A with positive polarisation as before.

The first antenna stack 1144A obtains from free space a positive polarisation receive signal which passes along the first feeder F121 to a first broad band receive filter RB1 incorporated in the second transmit/receive filter unit TRF2: after filtering by this filter, the receive signal is split by a first splitter SR1 into three signals for amplification by first, second and third LNAs LRB1, LRB2 and LRB3. Amplified signals output from the first and second LNAs LRB1 and LRB2 are filtered by first and second narrow band receive filters RN11 and RN23 with pass bands defining first and third receive frequencies RX1 and RX3 and incorporated in the first and third transmit/receive filter units TRF1 and TRF3 respectively. Signals filtered by the receive filters RN11 and RN23 provide respectively a first frequency (RX1) receive signal for the first base station BS121 and a third frequency space diversity receive signal (RX3D) for the third base station BS123. Each of the narrow band receive filters RN11 and RN23 and others such to be described later has a bandwidth sufficiently wide only for the receive signal frequency of the respective base station to which it is connected. This reduces out-of-band interference presented to base stations BS121 etc.

An amplified signal output from the third LNA LRB3 is split by a second splitter SR2 into two signals which are filtered by third and fourth narrow band receive filters RN32 and RN44 with pass bands defining respectively second and fourth receive frequencies RX2 and RX4. Signals filtered by these receive filters provide second and fourth frequency receive signals (RX2D and RX4D) with space diversity for the second and fourth base stations BS122 and BS124 respectively.

Similarly, a second frequency (TX2) transmit signal from the third base station BS122 passes to the first base station filter assembly 1263($a$), where it is filtered by fifth and sixth narrow band transmit filters TN52 and TN62 incorporated in fourth and fifth transmit/receive filter units TRF4 and TRF5 respectively; it is then relayed via the third feeder F123 to the second antenna assembly 1154B for processing as described with reference to FIG. 11 and radiation from the second antenna stack 1144B with positive polarisation.

A fourth frequency (TX4) transmit signal from the fourth base station BS124 passes to the first base station filter assembly 1263($a$) for filtering by seventh and eighth narrow band transmit filters TN74 and TN84 incorporated in a sixth and the fifth transmit/receive filter units TRF6 and TRF5 respectively; it is then relayed via the third feeder F123 to the second antenna assembly 1154B for processing as described with reference to FIG. 11 and radiation from the second antenna stack 1144B with positive polarisation as before.

The second antenna stack 1144B obtains from free space a positive polarisation receive signal which passes along the third feeder F121 to a broad band receive filter RB2 incorporated in the fifth transmit/receive filter unit TRF5: after filtering by this filter, the receive signal is split by a third splitter SR3 into three signals for amplification by fourth, fifth and sixth LNAs LRB4, LRB5 and LRB6 respectively. Amplified signals output from the fourth and fifth LNAs LRB4 and LRB5 are filtered by fifth and sixth narrow band receive filters RN52 and RN64 with pass bands defining second and fourth receive frequencies RX2 and RX4 and incorporated in the fourth and sixth transmit/receive filter units TRF4 and TRF6 respectively. Signals filtered by the receive filters RN52 and RN64 provide respectively a second frequency (RX2) receive signal for the second base station BS122 and a fourth frequency space diversity receive signal (RX4D) for the fourth base station BS124.

An amplified signal output from the sixth LNA LRB6 is split by a fourth splitter SR4 into two signals which are filtered by seventh and eighth narrow band receive filters RN71 and RN83 with pass bands defining respectively first and third receive frequencies RX1 and RX3. Signals filtered by these receive filters provide first and third frequency receive signals (RX1D and RX3D) with space diversity for the first and third base stations BS121 and BS123 respectively.

The first base station filter assembly 1263(a) therefore provides for transmit and receive signals associated with positive polarisation to pass via the first antenna stack 1144A and the first feeder F121 to or from the first and third base stations BS121 and BS123, or alternatively via the second antenna stack 1144B and the third feeder F123 to or from the second and fourth base stations BS122 and BS124. Each base station has a respective transmit frequency and a respective receive frequency. Signals combined on each feeder have non-contiguous frequencies, so the problem of filters not giving adequate separation of contiguous frequencies does not occur. All four base stations BS121 to BS124 are associated with the same antenna tilt angle (a) and positive polarisation with which their signals are transmitted from or received by antenna stack 1144A or 1144B.

The second base station filter assembly 1263(b) will not be described in detail, because it is equivalent to the first base station filter assembly 1263(a) except for changes to filter pass bands as appropriate to its transmit and receive signal frequencies: it likewise provides for filtering and routing of transmit and receive signals associated with an additional four base stations (not shown), i.e. fifth to eighth base stations. These signals are however associated with negative polarisation (as opposed to positive polarisation previously): they pass via the first antenna stack 1144A and the second feeder F122 to or from fifth and seventh base stations, or alternatively via the second antenna stack 1144B and the fourth feeder F124 to or from sixth and eighth base stations. Here again, each base station has a respective transmit frequency (TX5, TX6, TX7 or TX8) and a respective receive frequency (RX5, RX6, RX7 or RX8), and signals combined on each feeder have non-contiguous frequencies. All four of these additional base stations are associated with the same antenna tilt angle and polarisation, but it is now tilt angle (b) and negative polarisation: these base stations' signals are therefore transmitted from or received by antenna stack 1144A or 1144B with both different tilt angle and different polarisation compared to base stations BS121 to BS124.

Odd numbered base stations (e.g. BS121 and BS123) are associated with odd numbered frequencies which are non-contiguous, likewise even numbered frequencies and base stations (e.g. BS122 and BS124). Feeders (e.g. F121), antenna filter units (e.g. 1160A(+)) and antenna stack polarisations (see FIG. 11) are used for odd numbered frequencies or even numbered frequencies but not both. Consequently, adjacent contiguous frequencies indicated by suffix numbers 1 and 2 or 2 and 3 etc. are not combined before radiation from antennas 144A and 1144B and do not give rise to combining problems in antenna or base station circuitry. The antenna system 1240 is therefore suitable for contiguous frequency operation. Also, here again this embodiment 1240 has odd numbered and even numbered groups of carrier frequencies (1, 3, 5, 7 and 2, 4, 6, 8) distinguished by each group sharing a different tilt angle to that of the other group.

The antenna system 1240 has capability for modification to add further operating frequencies. To add a new odd numbered transmit frequency and a like numbered receive frequency with associated operator and base station, a further transmit/receive filter unit which passes these frequencies is added to the left hand side of the base station filter assembly 1263(a); also, a narrow band transmit filter which passes the new transmit frequency is added to the second transmit/receive filter unit TRF2. The first splitter SR1 is arranged to split into four receive signals instead of three: the fourth or extra receive signal so formed is amplified by an additional LNA, filtered in the further transmit/receive filter unit and passed to the new base station. The fourth splitter SR4 is arranged to split into three receive signals instead of two, and the third or extra receive signal so formed is filtered in an additional narrow band receive filter and passed to the new base station as a new space diversity receive signal (RXqD, where q is an odd number greater than 3).

Capability for further even numbered transmit and receive frequencies may similarly be provided in the right hand side of the base station filter assembly 1263(a) by adding filters, splitter outputs and an LNA. The other base station filter assembly 1263(b) may be modified likewise for additional odd and even numbered transmit and receive frequencies.

Table 1 below indicates a number of antenna system configurations which are possible by means of the invention: they are distinguished by variant numbers 1 to 6, and variant 3 has three versions 3a, 3b and 3c. In the table Antenna Stack A and Antenna Stack B are designated by analogy with antenna stacks suffixed A and B in FIGS. 2 to 13, e.g. antenna stacks 44A and 44B; dipole polarisation refers to (+) and (−) polarisations of dipoles such as 46A, 46B and 48A. Frequencies (e.g. TX1, RX1) and their space diversity equivalents (e.g. RX1D) are as defined previously. IP Severity refers to severity of intermodulation products, the configurations shown in Table 1 being ranked in ascending order of anticipated relative level of IPs from 1 to 6, with level 6 being the highest severity.

TABLE 1

Allocation of Transmit and Receive Carrier Frequencies

| Channels | Variant | Antenna Stack A Dipole Polarisation (+) | Antenna Stack A Dipole Polarisation (−) | Antenna Stack B Dipole Polarisation (+) | Antenna Stack B Dipole Polarisation (−) | IP Severity | Comments |
|---|---|---|---|---|---|---|---|
| 2 | 1 | TX1 RX1 | RX2D | RX1D | TX2 RX2 | 1 | Co-polarised RX & RXD tilt angles. |
|  | 2 | TX1 RX1 | RX2D | TX2 RX2 | RX1D | 2 | Anti-polarised RX & RXD tilt angles. |
|  | 3a | TX1 RX1 | TX2 RX2 | RX1D | RX2D | 3 | Co-polarised receive & receive diversity tilt angles. |
|  | 3b | TX1 RX1 | TX2 RX2 | RX2D | RX1D | 3 | Anti-polarised receive & receive diversity tilt angles. |
|  | 3c | TX1 RX1 RX2D | TX2 RX2 RX1D |  |  | 3 | Anti-polarised receive & receive diversity tilt angles. |

TABLE 1-continued

Allocation of Transmit and Receive Carrier Frequencies

| Channels | Variant | Antenna Stack A Dipole Polarisation (+) | Antenna Stack A Dipole Polarisation (−) | Antenna Stack B Dipole Polarisation (+) | Antenna Stack B Dipole Polarisation (−) | IP Severity | Comments |
|---|---|---|---|---|---|---|---|
| 3 | 4 | TX1 RX1 | TX3 RX3 RX2D | RX1D | TX2 RX2 RX3D | 4 | Co-polarised receive & receive diversity tilt angles. TX2, TX3 have common tilt. |
| | 5 | TX1 RX1 | TX3 RX3 RX2D | TX2 RX2 RX3D | RX1D | 5 | Anti-polarised receive & receive diversity tilt angles. TX2, TX3 have common tilt. |
| 4 | 6 | TX1 RX1 RX4D | TX3 RX3 RX2D | TX4 RX4 RX1D | TX2 RX2 RX3D | 6 | Co-polarised receive & receive diversity tilt angles. TX1, TX4 have common tilt. TX2, TX3 have common tilt. |

Measurements indicate that multi-stack antenna assemblies, and multi-antenna assemblies, generate lower levels of intermodulation products (IPs) when transmit signals are anti-polarised because this results in higher isolation between transmitters. The actual level of such IPs will depend on air path coupling between antenna assemblies, and also on coupling introduced through a gantry on which antenna assemblies are mounted. Variants 1, 3a, 4, and 6 have co-polarised tilt angles. Variants 2 and 5 have anti-polarised tilt angles, for receive & receive diversity. Variants 1 to 6 also indicate an up-grade sequence for addition of further transmit carrier frequencies, unless otherwise determined by factors such as IP levels or polarisation advantages.

In a UMTS system TX3 may be a transmit diversity signal for TX1, so that TX3=TX1D. Similarly TX4 may be a transmit diversity signal for TX2, so that TX4=TX2D. While it is preferable that associated signals (TX, TXD, RX, RXD) have an identical angle of tilt, it is not essential when additional coverage is provided by a diversity transmit channel even where a transmit signal and its associated transmit diversity signal do not illuminate overlapping geographical areas entirely. Such a technique can trade diversity benefit at cell edges for coverage benefit close to an antenna system site: this may be useful as an additional network design optimisation freedom, especially for cell edge environments with high dispersion perhaps serving fast moving mobile telephones, where most diversity benefit are is from Rake Receiver, Coding and Interleaving of data channels, and where a site is high yet also above a dense traffic demand environment. In general, adjustment of tilt angle in a range of 2 to 6 degrees is sufficient to optimise coverage and minimise adjacent site interference. With a beam width of typically 7 or 8 degrees in the vertical plane, a receive diversity gain may be obtained even where one, or more, of the diverse receive signals has a different angle of tilt. However, sharing of tilt angles for receive signals causes an inter-channel dependence so that adjustment of transmit angle for one channel will change receive coverage for another.

Table 1 indicates a number of dual channel configurations, but embodiments have been described with antenna assemblies each having four ports conveying receive signals. While in general each antenna assembly will have two tilt angles which are different, antenna beam width in the vertical plane is sufficiently wide to provide for a larger part of the coverage area associated with each beam to be common to both tilt angles. Consequently, a base station associated with a receive signal RX1 and a single diverse receive signal RX1D may be enhanced to have either two or three diverse receive signals RX1D1, RX1D2 and RX1D3 with a subsequent further improvement in up-link communications performance.

All embodiments of the invention are disclosed with co-polarisation coupled tilt angles. Anti-polarisation coupled tilt angles may be obtained by swapping connections to ports of one of the antenna assemblies and swapping connections to antenna assembly tilt controls.

Embodiments of the invention distinguish between different users, base stations, cellular standards (e.g. GSM, UMTS) etc. on the basis of signal frequency: consequently embodiments of the invention operating with multiple signal frequencies in transmit or receive can accommodate multiple user or operator frequencies, multiple base stations or multiple cellular radio standards or a mixture of these. Examples relevant to the invention include use of the antenna system by one operator using two different frequencies or two different cellular radio standards, and different operators using such frequencies or standards.

To reduce interference and maintain good receive sensitivity and selectivity it is preferable that a receive signal at an input to a receive port (or transmit/receive port) of a base station has a minimum number of unwanted receive signal frequencies whether on the same, or nearby, receive channels. This is particularly true in a Code Division Multiple Access (CDMA) system, or for an antenna installation which is shared between channels allocated to different systems. For this reason, embodiments described above show filters in each receive path having a pass band appropriate to channel or system frequencies appropriate to each base station.

If the desirability of avoiding unwanted receive signals is less important, receive filters may have a wider bandwidth thus reducing both filter complexity and number of filters required.

The incorporation of LNAs in a base station filter assembly is an option depending on feeder loss tolerance and required receive channel gain input for the base station. If an antenna assembly has an LNA with sufficient gain and dynamic range to provide an optimum receive signal at a base station receive input then an LNA in a base station filter assembly may not be necessary. However, incorporation of LNAs in a base station filter assembly allows for base stations having different receive gain or level requirements.

The invention claimed is:

1. An antenna system, comprising:
two dual polarised, tilt adjustable antennas with a physical separation providing a space diversity:
wherein each antenna has first and second tilt angle controls for independent control of first and second electrical tilt angles of first and second polarisation antenna beams respectively, wherein the first and second polarisation antenna beams have first and second polarisation respectively, wherein the first and second polarisations are orthogonal; and
wherein the first and second electrical tilt angles of the first and second polarisation antenna beams are controllable to provide one of:
a co-polarisation tilt coupling, wherein the co-polarisation tilt coupling comprises an operational state in which a first electrical tilt angle is applied to both of the first polarisation antenna beams from the first and second antennas respectively and in which a second electrical tilt angle is applied to both of the second polarisation antenna beams from the first and second antennas respectively; and
an anti-polarisation tilt coupling, wherein the anti-polarisation tilt coupling comprises an operational state in which a respective electrical tilt angle is applied to each polarisation antenna beam of the first antenna to be the same as a corresponding respective electrical tilt angle that is applied to a respective opposite polarisation antenna beam of the second antenna.

2. The antenna system according to claim 1 including two feeders coupled to base station equipment to convey signals between the base station equipment and the antennas.

3. The antenna system according to claim 1 including three feeders coupled to base station equipment for conveying signals between the base station equipment and the antennas, one of the feeders being for receive signals only, the receive signals being associated both with different antennas of the first and second antennas and with different polarisations of the first and second polarisations.

4. The antenna system according to claim 1 including four feeders coupled to base station equipment for conveying signals between the base station equipment and the antennas, two of the feeders being for receive signals only and associated both with different antennas of the first and second antennas and with different polarisations of the first and second polarisations.

5. The antenna system according to claim 4 including broad band filtering means co-located with the antennas in antenna assemblies and narrow band filtering means co-located with the base station equipment.

6. The antenna system according to claim 1 including four feeders coupled to base station equipment for conveying transmit and receive signals between the base station equipment and the antennas, two of the feeders being associated with different polarisations of one of the antennas, and another two of the feeders being associated with different polarisations of the other of the antennas.

7. The antenna system according to claim 6 including narrow band filtering means co-located with the antennas in antenna assemblies.

8. The antenna system according to claim 1 including four feeders coupled to base station equipment for conveying signals between the base station equipment and the first and second antennas, two of the feeders being for first and second transmit signals associated respectively with the first polarisation of the first antenna and the second polarisation of the second antenna, a third one of the feeders being for receive signals also associated respectively with the first polarisation of the first antenna and the second polarisation of the second antenna, and a fourth one of the feeders being for receive signals associated respectively with the second polarisation of the first antenna and the first polarisation of the second antenna.

9. The antenna system according to claim 1 wherein each polarisation of each antenna is associated with a respective broad band filtering means, a respective feeder coupled to base station equipment and a respective narrow band filtering means.

10. The antenna system according to claim 9 wherein each of the respective broad band filtering means is located in an antenna assembly and is connected by the respective feeder to the respective narrow band filtering means co-located with the base station equipment.

11. The antenna system according to claim 10 wherein each of the respective narrow band filtering means is arranged to divide signals with contiguous frequencies into groups of signals with non-contiguous frequencies.

12. The antenna system according to claim 1 including filtering means for defining signals of like frequency associated with different antennas and for providing space diversity in at least one of transmit and receive modes of operation.

13. The antenna system according to claim 1 wherein one of the antennas has antenna elements arranged for transmission of a first frequency transmit signal and the other one of the antennas has antenna elements arranged for transmission of a first frequency space diversity transmit signal.

14. The antenna system according to claim 1 arranged to provide for one receive signal to be associated with multiple receive diversity signals.

15. A method of operating an antenna system having two dual polarised, tilt adjustable antennas with a physical separation providing a space diversity, wherein each of the antennas has first and second polarisation antenna beams, the method comprising:
for each of the antennas, adjusting electrical tilt angles of the first and second polarisation antenna beams independently, wherein the first and second polarisation antenna beams have first and second polarisations respectively, wherein the first and second polarisations are orthogonal; and
controlling the electrical tilt angles of the first and second polarisation antenna beams of the first antenna and the electrical tilt angles of first and second polarisation antenna beams of the second antenna to provide one of:
a co-polarisation tilt coupling, wherein the co-polarisation tilt coupling comprises an operational state in which a first electrical tilt angle is applied to both of the first polarisation antenna beams from the first and second antennas respectively and in which a second electrical tilt angle is applied to both of the second polarisations antenna beams from the first and second antennas respectively; and
an anti-polarisation tilt coupling, wherein the anti-polarisation tilt coupling comprises an operational state in which a respective electrical tilt angle is applied to each polarisation antenna beam of the first antenna to be the same as a corresponding respective electrical tilt angle that is applied to a respective opposite polarisation antenna beam of the second antenna.

16. The method according to claim 15, further comprising:
conveying signals between base station equipment and the antennas using two feeders.

17. The method according to claim 15, further comprising:
conveying signals between base station equipment and the antennas using three feeders, using one of the feeders for receive signals only, the receive signals being associated both with different antennas of the first and second antennas and with different polarisations of the first and second polarisations.

18. The method according to claim 15, further comprising:
conveying signals between base station equipment and the antennas using four feeders, using two of the feeders for receive signals only, the receive signals being associated both with different antennas of the first and second antennas and with different polarisations of the first and second polarisations.

19. The method according to claim 18, wherein the antenna system includes broad band filtering with filtering means co-located with the antennas in antenna assemblies and narrow band filtering with filtering means co-located with the base station equipment.

20. The method according to claim 15, further comprising:
conveying transmit and receive signals between base station equipment and the antennas using four feeders, two of the feeders being associated with different polarisations of one of the antennas, and another two of the feeders being associated with different polarisations of the other of the antennas.

21. The method according to claim 20, further comprising:
narrow band filtering with filtering means co-located with each of the antennas in antenna assemblies.

22. The method according to claim 15, further comprising:
using four feeders for conveying signals between base station equipment and the first and second antennas, using two of the feeders for first and second transmit signals associated respectively with the first polarisation of the first antenna and the second polarisation of the second antenna, using a third one of the feeders for receive signals also associated respectively with the first polarisation of the first antenna and the second polarisation of the second antenna, and using a fourth one of the feeders for receive signals associated respectively with the second polarisation of the first antenna and the first polarisation of the second antenna.

23. The method according to claim 15 wherein each polarisation of each antenna is associated with broad band filtering means, a respective feeder coupled to base station equipment and narrow band filtering means.

24. The method according to claim 23 wherein the broad band filtering means is implemented in an antenna assembly and the narrow band filtering means is co-located with the base station equipment.

25. The method according to claim 24, further comprising:
using the narrow band filtering means to divide signals with contiguous frequencies into groups of signals with non-contiguous frequencies.

26. The method according to claim 15, further comprising:
filtering to define signals of like frequency associated with different antennas and to provide space diversity in at least one of transmit and receive modes of operation.

27. The method according to claim 15 wherein one of the antennas has antenna elements arranged for transmission of a first frequency transmit signal and the other one of the antennas has antenna elements arranged for transmission of a first frequency space diversity transmit signal.

28. The method according to claim 15, further comprising:
providing for one receive signal to be associated with multiple receive diversity signals.

* * * * *